United States Patent
Jannard et al.

(10) Patent No.: US 11,818,351 B2
(45) Date of Patent: Nov. 14, 2023

(54) VIDEO IMAGE DATA PROCESSING IN ELECTRONIC DEVICES

(71) Applicant: RED.COM, LLC, Irvine, CA (US)

(72) Inventors: James H. Jannard, Las Vegas, NV (US); Peter Jarred Land, Los Angeles, CA (US); Manjunath Subray Bhat, Thousand Oaks, CA (US)

(73) Assignee: RED.COM, LLC, Irvine, CA (US)

( * ) Notice: Subject to any disclaimer, the term of this patent is extended or adjusted under 35 U.S.C. 154(b) by 0 days.

(21) Appl. No.: 17/970,882

(22) Filed: Oct. 21, 2022

(65) Prior Publication Data

US 2023/0224461 A1    Jul. 13, 2023

Related U.S. Application Data

(63) Continuation of application No. 17/166,930, filed on Feb. 3, 2021, now Pat. No. 11,503,294, which is a
(Continued)

(51) Int. Cl.
*H04N 19/122* (2014.01)
*H04N 19/18* (2014.01)
(Continued)

(52) U.S. Cl.
CPC ......... *H04N 19/122* (2014.11); *H04N 19/124* (2014.11); *H04N 19/13* (2014.11);
(Continued)

(58) Field of Classification Search
CPC .... H04N 19/122; H04N 19/124; H04N 19/13; H04N 19/18; H04N 19/91; H04N 19/93
See application file for complete search history.

(56) References Cited

U.S. PATENT DOCUMENTS

| | | |
|---|---|---|
| 3,154,493 A | 10/1964 | Pierrot et al. |
| 3,971,065 A | 7/1976 | Bayer |

(Continued)

FOREIGN PATENT DOCUMENTS

| | | |
|---|---|---|
| CN | 1581975 | 2/2005 |
| CN | 1941842 | 4/2007 |

(Continued)

OTHER PUBLICATIONS

US 9,392,240 B2, 07/2016, Jannard et al. (withdrawn)
(Continued)

*Primary Examiner* — Jae N Noh
(74) *Attorney, Agent, or Firm* — Knobbe, Martens, Olson & Bear, LLP

(57) ABSTRACT

In some embodiments, an electronic device for compressing video image data includes a housing, an image sensor, a memory device, and one or more processors. The image sensor can generate image data from light incident on the image sensor. The one or more processors can transform the image data to obtain transform coefficients, quantize the transform coefficients, encode the quantized transform coefficients, and store the quantized transform coefficients to the memory device. The one or more processors can encode the quantized transform coefficients at least by determining a range of multiple ranges in which one transform coefficient is included, determining a value within the range to which the one transform coefficient corresponds, encoding using a first algorithm the range as a range code, and encoding using a second algorithm the value as a value code.

20 Claims, 12 Drawing Sheets

Related U.S. Application Data continuation of application No. 16/027,104, filed on Jul. 3, 2018, now Pat. No. 11,019,336.

(60) Provisional application No. 62/679,710, filed on Jun. 1, 2018, provisional application No. 62/529,455, filed on Jul. 6, 2017, provisional application No. 62/528,968, filed on Jul. 5, 2017.

(51) Int. Cl.
*H04N 19/124* (2014.01)
*H04N 19/91* (2014.01)
*H04N 19/13* (2014.01)
*H04N 19/93* (2014.01)

(52) U.S. Cl.
CPC ............ *H04N 19/18* (2014.11); *H04N 19/91* (2014.11); *H04N 19/93* (2014.11)

(56) References Cited

U.S. PATENT DOCUMENTS

| | | |
|---|---|---|
| 3,972,010 A | 7/1976 | Dolby |
| 4,200,889 A | 4/1980 | Strobele |
| 4,316,213 A | 2/1982 | Wharton et al. |
| 4,450,487 A | 5/1984 | Koide |
| 4,561,012 A | 12/1985 | Acampora |
| 5,016,107 A | 5/1991 | Sasson et al. |
| 5,040,063 A | 8/1991 | Citta et al. |
| 5,049,983 A | 9/1991 | Matsumoto et al. |
| 5,132,803 A | 7/1992 | Suga et al. |
| 5,172,227 A | 12/1992 | Tsai et al. |
| 5,249,053 A | 9/1993 | Jain |
| 5,255,083 A | 10/1993 | Capitant et al. |
| 5,303,062 A | 4/1994 | Kawarai |
| 5,343,243 A | 8/1994 | Maeda |
| 5,412,427 A | 5/1995 | Rabbani et al. |
| 5,442,718 A | 8/1995 | Kobayashi et al. |
| 5,526,047 A | 6/1996 | Sawanobori |
| 5,535,246 A | 7/1996 | Beech |
| 5,537,157 A | 7/1996 | Washino et al. |
| 5,563,655 A | 10/1996 | Lathrop |
| 5,592,224 A | 1/1997 | Shim |
| 5,592,237 A | 1/1997 | Greenway |
| 5,600,373 A | 2/1997 | Chui et al. |
| 5,602,594 A | 2/1997 | Cho et al. |
| 5,638,126 A | 6/1997 | Lim |
| 5,650,860 A | 7/1997 | Uz |
| 5,745,178 A | 4/1998 | Hartung |
| 5,818,524 A | 10/1998 | Juen |
| 5,875,122 A | 2/1999 | Acharya |
| 5,949,468 A | 9/1999 | Asahina et al. |
| 5,991,515 A | 11/1999 | Fall et al. |
| 5,999,218 A | 12/1999 | Yokoyama |
| 5,999,220 A | 12/1999 | Washino |
| 6,009,201 A | 12/1999 | Acharya |
| 6,091,851 A | 7/2000 | Acharya |
| 6,124,811 A | 9/2000 | Acharya et al. |
| 6,154,493 A | 11/2000 | Acharya et al. |
| 6,169,317 B1 | 1/2001 | Sawada et al. |
| 6,192,086 B1 | 2/2001 | Darr |
| 6,198,505 B1 | 3/2001 | Turner et al. |
| 6,262,763 B1 | 7/2001 | Totsuka |
| 6,269,217 B1 | 7/2001 | Rodriguez |
| RE37,342 E | 8/2001 | Washino et al. |
| 6,275,263 B1 | 8/2001 | Hu |
| 6,285,794 B1 | 9/2001 | Georgiev et al. |
| 6,314,206 B1 | 11/2001 | Sato |
| 6,349,154 B1 | 2/2002 | Kleihorst |
| 6,466,699 B2 | 10/2002 | Schwartz et al. |
| 6,504,494 B1 | 1/2003 | Dyas et al. |
| RE38,079 E | 4/2003 | Washino et al. |
| 6,567,988 B1 | 5/2003 | Okawa |
| 6,597,860 B2 | 7/2003 | Song et al. |
| 6,628,717 B1 | 9/2003 | Jeong et al. |
| 6,654,419 B1 | 11/2003 | Sriram et al. |
| 6,697,106 B1 | 2/2004 | Saito |
| 6,760,135 B1 | 7/2004 | Payne et al. |
| 6,778,709 B1 | 8/2004 | Taubman |
| 6,798,901 B1 | 9/2004 | Acharya et al. |
| 6,825,876 B1 | 11/2004 | Easwar et al. |
| 6,859,226 B2 | 2/2005 | Kawamura et al. |
| 6,867,717 B1 | 3/2005 | Ion |
| 6,878,977 B1 | 4/2005 | Kozuka et al. |
| 6,937,276 B2 | 8/2005 | Chung |
| 6,944,349 B1 | 9/2005 | Onno et al. |
| 6,958,774 B2 | 10/2005 | Kuroiwa |
| 6,983,074 B1 | 1/2006 | Clauson et al. |
| 6,989,773 B2 | 1/2006 | Wee et al. |
| 6,990,240 B2 | 1/2006 | Hagiwara |
| 6,995,793 B1 | 2/2006 | Albadawi et al. |
| 6,995,794 B2 | 2/2006 | Hsu et al. |
| 7,038,719 B2 | 5/2006 | Hirai |
| 7,039,254 B1 | 5/2006 | Maenaka et al. |
| 7,050,642 B2 | 5/2006 | Graffagnino |
| 7,092,016 B2 | 8/2006 | Morton et al. |
| 7,095,899 B2 | 8/2006 | Malvar |
| 7,110,605 B2 | 9/2006 | Marcellin et al. |
| 7,113,645 B2 | 9/2006 | Sano et al. |
| 7,126,634 B2 | 10/2006 | Kato |
| 7,127,116 B2 | 10/2006 | Goldstein et al. |
| 7,155,066 B2 | 12/2006 | Baharav |
| 7,174,045 B2 | 2/2007 | Yokonuma |
| 7,190,496 B2 | 3/2007 | Klug et al. |
| 7,212,313 B1 | 5/2007 | Hoel |
| 7,253,836 B1 | 8/2007 | Suzuki et al. |
| 7,312,821 B2 | 12/2007 | Voss |
| 7,313,286 B2 | 12/2007 | Schwartz et al. |
| 7,324,141 B2 | 1/2008 | Kubo et al. |
| 7,343,043 B2 | 3/2008 | Yokonuma |
| 7,349,574 B1 | 3/2008 | Sodini et al. |
| 7,349,579 B2 | 3/2008 | Kadowaki et al. |
| 7,365,658 B2 | 4/2008 | Todorov et al. |
| 7,369,161 B2 | 5/2008 | Easwar et al. |
| 7,376,183 B2 | 5/2008 | Weigand et al. |
| 7,385,647 B2 | 6/2008 | Park |
| 7,388,992 B2 | 6/2008 | Atsumi et al. |
| 7,394,485 B2 | 7/2008 | Kim |
| 7,477,781 B1 | 1/2009 | Tanbakuchi |
| 7,480,417 B2 | 1/2009 | Malvar |
| 7,483,909 B2 | 1/2009 | Sena et al. |
| 7,512,283 B2 | 3/2009 | Brower |
| 7,526,134 B2 | 4/2009 | Matsubara |
| 7,577,689 B1 | 8/2009 | Masinter et al. |
| 7,590,301 B2 | 9/2009 | Wu |
| 7,609,300 B2 | 10/2009 | Wu |
| 7,656,561 B2 | 2/2010 | Mølgaard et al. |
| 7,778,473 B2 | 8/2010 | Kodama |
| 7,796,186 B2 | 9/2010 | Oshima |
| 7,830,967 B1 | 11/2010 | Jannard et al. |
| 7,868,879 B2 | 1/2011 | Rizko |
| 7,898,575 B2 | 3/2011 | Ishii |
| 7,902,512 B1 | 3/2011 | Chang et al. |
| 7,907,791 B2 | 3/2011 | Kinrot |
| 7,936,919 B2 | 5/2011 | Kameyama |
| 7,952,636 B2 | 5/2011 | Ikeda et al. |
| 8,014,597 B1 | 9/2011 | Newman |
| 8,125,547 B2 | 2/2012 | Oda et al. |
| 8,170,402 B2 | 5/2012 | Frost-Ruebling et al. |
| 8,174,560 B2 | 5/2012 | Jannard et al. |
| 8,237,830 B2 | 8/2012 | Jannard et al. |
| 8,358,357 B2 | 1/2013 | Jannard et al. |
| 8,477,173 B2 | 7/2013 | Kenoyer |
| 8,625,013 B2 | 1/2014 | Jannard et al. |
| 8,792,029 B2 | 7/2014 | Lee |
| 8,817,141 B2 | 8/2014 | Tanaka |
| 8,849,090 B2 | 9/2014 | Kosakai et al. |
| 8,872,933 B2 | 10/2014 | Jannard et al. |
| 8,878,952 B2 | 11/2014 | Jannard et al. |
| 8,942,283 B2 | 1/2015 | Pace |
| 9,019,393 B2 | 4/2015 | Jannard et al. |
| 9,025,929 B2 | 5/2015 | Kosakai et al. |
| 9,128,226 B2 | 9/2015 | Fattal et al. |
| 9,230,299 B2 | 1/2016 | Jannard et al. |

(56) References Cited

U.S. PATENT DOCUMENTS

| | | |
|---|---|---|
| 9,245,314 B2 | 1/2016 | Jannard et al. |
| 9,304,491 B2 | 4/2016 | Nikonov et al. |
| 9,436,976 B2 | 9/2016 | Jannard et al. |
| 9,459,461 B2 | 10/2016 | Santori et al. |
| 9,521,384 B2 | 12/2016 | Jannard et al. |
| 9,565,419 B2 | 2/2017 | Presler |
| 9,568,808 B2 | 2/2017 | Pizzo et al. |
| 9,596,385 B2 | 3/2017 | Jannard et al. |
| 9,716,866 B2 | 7/2017 | Jannard et al. |
| 9,787,878 B2 | 10/2017 | Jannard et al. |
| 9,792,672 B2 | 10/2017 | Jannard et al. |
| 9,800,875 B2 | 10/2017 | Bhat |
| 9,917,935 B2 | 3/2018 | Pizzo et al. |
| 10,531,098 B2 | 1/2020 | Bhat |
| 11,019,336 B2 | 5/2021 | Jannard et al. |
| 11,076,164 B2 | 7/2021 | Bhat |
| 11,503,294 B2 | 11/2022 | Jannard et al. |
| 2001/0014123 A1 | 8/2001 | Strasman et al. |
| 2001/0024529 A1 | 9/2001 | Chao et al. |
| 2001/0048477 A1 | 12/2001 | Misawa |
| 2002/0012055 A1 | 1/2002 | Koshiba et al. |
| 2002/0033737 A1 | 3/2002 | Staszewski et al. |
| 2002/0039142 A1 | 4/2002 | Zhang et al. |
| 2002/0041707 A1 | 4/2002 | Newman |
| 2002/0063787 A1 | 5/2002 | Watanabe |
| 2002/0167602 A1 | 11/2002 | Nguyen |
| 2002/0196354 A1 | 12/2002 | Chang et al. |
| 2003/0005140 A1 | 1/2003 | Dekel et al. |
| 2003/0007567 A1 | 1/2003 | Newman et al. |
| 2003/0011747 A1 | 1/2003 | Lenz |
| 2003/0018750 A1 | 1/2003 | Onno et al. |
| 2003/0031322 A1 | 2/2003 | Beckmann et al. |
| 2003/0038885 A1 | 2/2003 | Rodriguez |
| 2003/0053684 A1 | 3/2003 | Acharya |
| 2003/0122037 A1 | 7/2003 | Hyde et al. |
| 2003/0122937 A1 | 7/2003 | Guarnera et al. |
| 2003/0135302 A1 | 7/2003 | Hung et al. |
| 2003/0156188 A1 | 8/2003 | Abrams, Jr. |
| 2003/0185302 A1 | 10/2003 | Abrams, Jr. |
| 2003/0202106 A1 | 10/2003 | Kanleinsberger et al. |
| 2004/0032516 A1 | 2/2004 | Kakarala |
| 2004/0051793 A1 | 3/2004 | Tecu |
| 2004/0095477 A1 | 5/2004 | Maki et al. |
| 2004/0131274 A1 | 7/2004 | Perlmutter et al. |
| 2004/0146108 A1 | 7/2004 | Hsia |
| 2004/0165080 A1 | 8/2004 | Burks et al. |
| 2004/0169746 A1 | 9/2004 | Chen et al. |
| 2004/0169751 A1 | 9/2004 | Takemura et al. |
| 2004/0196389 A1 | 10/2004 | Honda |
| 2004/0201701 A1 | 10/2004 | Takagi |
| 2004/0201760 A1 | 10/2004 | Ota et al. |
| 2004/0213472 A1 | 10/2004 | Kodama et al. |
| 2004/0218812 A1 | 11/2004 | Douglass |
| 2004/0246346 A1 | 12/2004 | Kim et al. |
| 2005/0041116 A1 | 2/2005 | Tsukioka |
| 2005/0182972 A1 | 8/2005 | Apostolopoulos et al. |
| 2005/0183118 A1 | 8/2005 | Wee et al. |
| 2005/0213812 A1 | 9/2005 | Ishikawa et al. |
| 2005/0264661 A1 | 12/2005 | Kawanishi et al. |
| 2005/0276323 A1 | 12/2005 | Martemyanov et al. |
| 2005/0286797 A1 | 12/2005 | Hayaishi |
| 2006/0007324 A1 | 1/2006 | Takei |
| 2006/0012694 A1 | 1/2006 | Yoneda et al. |
| 2006/0061659 A1 | 3/2006 | Niwa |
| 2006/0061822 A1 | 3/2006 | Sung et al. |
| 2006/0114987 A1 | 6/2006 | Roman |
| 2006/0165178 A1 | 7/2006 | Ma et al. |
| 2006/0165179 A1 | 7/2006 | Feuer et al. |
| 2006/0170786 A1 | 8/2006 | Won |
| 2006/0210156 A1 | 9/2006 | Lei et al. |
| 2006/0221199 A1 | 10/2006 | Nakajima |
| 2006/0221203 A1 | 10/2006 | Abe et al. |
| 2006/0221230 A1 | 10/2006 | Dutt et al. |
| 2006/0232690 A1 | 10/2006 | Tamura et al. |
| 2006/0244842 A1 | 11/2006 | Hatano |
| 2006/0257129 A1 | 11/2006 | Shibatani |
| 2007/0035636 A1 | 2/2007 | Wu |
| 2007/0041634 A1 | 2/2007 | Sugimori |
| 2007/0051817 A1 | 3/2007 | Yano |
| 2007/0085916 A1 | 4/2007 | Nishio |
| 2007/0091187 A1 | 4/2007 | Lin |
| 2007/0092149 A1 | 4/2007 | Sung |
| 2007/0097217 A1 | 5/2007 | Yamamoto |
| 2007/0109316 A1 | 5/2007 | Fainstain |
| 2007/0127095 A1 | 6/2007 | Sugimori |
| 2007/0133902 A1 | 6/2007 | Kumar |
| 2007/0133967 A1 | 6/2007 | Takahashi et al. |
| 2007/0153093 A1 | 7/2007 | Lin et al. |
| 2007/0160142 A1 | 7/2007 | Abrams, Jr. |
| 2007/0164335 A1 | 7/2007 | McKee |
| 2007/0165116 A1 | 7/2007 | Hung et al. |
| 2007/0206852 A1 | 9/2007 | McGee |
| 2007/0216782 A1 | 9/2007 | Chernoff |
| 2007/0263937 A1 | 11/2007 | Rizko |
| 2007/0285517 A1 | 12/2007 | Ishikuro |
| 2007/0286278 A1 | 12/2007 | Govindaswamy |
| 2007/0291849 A1 | 12/2007 | Lainema |
| 2008/0002035 A1 | 1/2008 | Yoshida |
| 2008/0012953 A1 | 1/2008 | Yang et al. |
| 2008/0018746 A1 | 1/2008 | Kawanami |
| 2008/0055426 A1 | 3/2008 | Pertsel et al. |
| 2008/0062272 A1 | 3/2008 | Kuroiwa |
| 2008/0063070 A1 | 3/2008 | Schwartz et al. |
| 2008/0063269 A1 | 3/2008 | Chiu |
| 2008/0079818 A1 | 4/2008 | Takahashi |
| 2008/0084581 A1 | 4/2008 | Kobayashi et al. |
| 2008/0089406 A1 | 4/2008 | Fukuhara et al. |
| 2008/0131013 A1 | 6/2008 | Suino et al. |
| 2008/0240583 A1 | 10/2008 | Jones |
| 2008/0253463 A1 | 10/2008 | Lin et al. |
| 2008/0259180 A1 | 10/2008 | Ovsiannikov |
| 2008/0273809 A1 | 11/2008 | Demos |
| 2008/0284485 A1 | 11/2008 | Schilling |
| 2008/0285871 A1 | 11/2008 | Ishikawa |
| 2008/0301315 A1 | 12/2008 | Cheng et al. |
| 2008/0304564 A1 | 12/2008 | Kim |
| 2009/0033752 A1 | 2/2009 | Bodnar et al. |
| 2009/0046937 A1 | 2/2009 | Fenney |
| 2009/0052797 A1 | 2/2009 | Matsushita et al. |
| 2009/0052861 A1 | 2/2009 | Goldman |
| 2009/0080784 A1 | 3/2009 | Luh et al. |
| 2009/0086817 A1 | 4/2009 | Matsuoka et al. |
| 2009/0141140 A1 | 6/2009 | Robinson |
| 2009/0232408 A1 | 9/2009 | Meany |
| 2010/0014590 A1 | 1/2010 | Smith |
| 2010/0026849 A1 | 2/2010 | Hamada |
| 2010/0111489 A1 | 5/2010 | Presler |
| 2010/0134902 A1 | 6/2010 | Naitou |
| 2010/0135386 A1 | 6/2010 | Shibata et al. |
| 2010/0142811 A1 | 6/2010 | Okamoto et al. |
| 2010/0225795 A1 | 9/2010 | Suzuki et al. |
| 2011/0149110 A1 | 6/2011 | Sugiyama |
| 2011/0170794 A1 | 7/2011 | Ogawa et al. |
| 2011/0194763 A1 | 8/2011 | Moon et al. |
| 2011/0206115 A1 | 8/2011 | Okumura |
| 2011/0243226 A1 | 10/2011 | Choi |
| 2011/0268180 A1 | 11/2011 | Srinivasamurthy |
| 2011/0299594 A1 | 12/2011 | Raveendran et al. |
| 2012/0105960 A1 | 5/2012 | Park et al. |
| 2012/0121012 A1 | 5/2012 | Shiodera |
| 2012/0229926 A1 | 9/2012 | Wade et al. |
| 2013/0016427 A1 | 1/2013 | Sugawara |
| 2013/0027790 A1 | 1/2013 | Park et al. |
| 2013/0051457 A1 | 2/2013 | Joshi |
| 2013/0162849 A1 | 6/2013 | Wu et al. |
| 2013/0170039 A1 | 7/2013 | Miyoshi |
| 2013/0177301 A1 | 7/2013 | Nakayama et al. |
| 2013/0201559 A1 | 8/2013 | Minamisawa et al. |
| 2013/0202050 A1 | 8/2013 | Koto |
| 2013/0258172 A1 | 10/2013 | Seol et al. |
| 2014/0003528 A1 | 1/2014 | Tourapis |
| 2014/0063297 A1 | 3/2014 | Yamura |
| 2014/0161367 A1 | 6/2014 | Ridenour et al. |
| 2014/0218580 A1 | 8/2014 | Mayer et al. |

(56) References Cited

U.S. PATENT DOCUMENTS

| | | |
|---|---|---|
| 2014/0226036 A1 | 8/2014 | Jannard et al. |
| 2014/0333810 A1 | 11/2014 | Nakaseko |
| 2014/0341278 A1 | 11/2014 | Zheng |
| 2015/0023406 A1 | 1/2015 | Lee et al. |
| 2015/0092094 A1 | 4/2015 | Itonaga et al. |
| 2015/0229843 A1 | 8/2015 | Shimizu |
| 2015/0288965 A1 | 10/2015 | Li |
| 2015/0341668 A1 | 11/2015 | Lee |
| 2016/0029020 A1 | 1/2016 | Eymery |
| 2016/0044148 A1 | 2/2016 | Pizzo et al. |
| 2016/0094846 A1 | 3/2016 | Lee |
| 2016/0212427 A1 | 7/2016 | Yoneoka |
| 2016/0295096 A1 | 10/2016 | Lever et al. |
| 2017/0171371 A1 | 6/2017 | Jannard |
| 2017/0031829 A1 | 11/2017 | Choi |
| 2018/0139457 A1 | 5/2018 | Bhat |

FOREIGN PATENT DOCUMENTS

| | | |
|---|---|---|
| EP | 1 028 595 | 8/2000 |
| EP | 1 605 403 | 12/2005 |
| EP | 2 334 079 | 6/2011 |
| EP | 2 334 079 A1 | 6/2011 |
| EP | 2 512 137 | 10/2012 |
| JP | 06-054239 | 2/1994 |
| JP | 08-009373 | 1/1996 |
| JP | 2000-069488 | 3/2000 |
| JP | 2002-051266 | 2/2002 |
| JP | 2004-038693 | 2/2004 |
| JP | 2004-248061 | 9/2004 |
| JP | 2004-260821 | 9/2004 |
| JP | 2004-282780 | 10/2004 |
| JP | 2004-349842 | 12/2004 |
| JP | 2005-210216 | 8/2005 |
| JP | 2006-171524 | 6/2006 |
| JP | 2006-311314 | 11/2006 |
| JP | 2007-267072 | 10/2007 |
| JP | 2008-124976 | 5/2008 |
| JP | 2011-015347 | 1/2011 |
| KR | 10-2002-0041778 | 6/2002 |
| KR | 2006-0024609 | 3/2006 |
| KR | 2006-0024609 A | 3/2006 |
| KR | 10-2009-0035204 | 4/2009 |
| TW | 490590 | 6/2002 |
| TW | I326435 | 6/2010 |
| WO | WO 91/001613 | 2/1991 |
| WO | WO 92/010911 | 6/1992 |
| WO | WO 97/009818 | 3/1997 |
| WO | WO 99/012345 | 3/1999 |
| WO | WO 99/013429 | 3/1999 |
| WO | WO 99/060793 | 11/1999 |
| WO | WO 09/087783 | 7/2009 |
| WO | WO 11/084639 | 7/2011 |
| WO | WO 15/004323 | 1/2015 |

OTHER PUBLICATIONS

2K Digital Cinema Camera Streamlines Movie and HD Production, Silicon Imaging Digital Cinema, Press News Releases, Hollywood, California, date listed November 1, 2006, in 2 pages. (www.siliconimaging.com_DigitalCinema_News_PR_11_01_06_1).

4:4:4 12-bit Uncompressed DVX100, date listed May 11-16, 2004, in 9 pages. (http://www.dvinfo.net/forum/archive/index.php/t-20332-p-13.html).

Abel Cine, Abel North American Agent for Phantom Cameras, date listed Feb. 7, 2007, http://web.archive.org/web/20120523003248/http://about.abelcine.com/2007/02/07/abel-north-american-agent-for-phantom-cameras/ in 2 pages.

Arriflex D-20 Preliminary Specifications, archive.org indicates available on-line on May 31, 2005, www.arri.com, [online], http://webarchive.org/web/20050531010626/www.arri.com/entry/products.htm, pp. 1-2.

Arriflex D-21: The Film Style Digital Camera, date listed Jan. 4, 2008, www.arri.de, [online] http://www.arri.de/press/press/press_release.html?tx_ttnews[tt_news]=32&tx_ttnews[backPid]=1781&cHash=e89c9b0855e89c9b0855.

Bazhyna et al., Near-lossless compression algorithm for Bayer pattern color filter arrays SPIE—The International Society for Optical Engineering, vol. 5678; Copyright date listed is 2005.

Bruner, Guy, Silicon Imaging Shows 1920×1080P Camera System, Camcorder News, Las Vegas, NAB, date listed Apr. 25, 2006, in 8 pages. (http://www.camcorderinfo.com/content/Silicon-Imaging-Shows-1920x1080P-Camera-System.htm).

Canon, Digital Video Camcorder Instruction Manual: XL2, Canon Inc., 2004, in 122 pages.

Chandler et al., Visually Lossless Compression of Digitized Radiographs Based on Contrast Sensitivity and Visual Masking, Proceedings of SPIE, vol. 5749, 2005, in 14 pages.

Chapter 6 "Gamma" of the book "A Technical Introduction to Digital Video," by Charles Poynton, published in 1996, pp. 91-114.

CineForm Insider, blog post dated Nov. 13, 2007; http://cineform.blogspot.com/2007/11/cineform-on-chip.html, in 3 pages.

CineForm Insider, date listed as Jan. through Dec. 2006, in 17 pages. (http://cineform.blogspot.com/search?updated-min=2006-01-01T00:00:00-08:00&updated-max=2007-01-01T00:00:00-08:00&max-results=22).

CineForm Online Workflow Solutions for Film and Video, date listed Nov. 1, 2006.

CineForm Raw—Dalsa and Vision Research Raw File Converters, printed Aug. 16, 2010, www.cineform.com, [online].

CineForm RAW—Technology Overview and Workflow, date listed Apr. 13, 2006, in 3 pages.

CinemaTechnic Camera Profiles | ARRI 168R, date listed 2001. <http://cinematechnic.com/resources/arri_168R.html>, date retrieved Feb. 12, 2010.

Color Filter Array Designs, as archived by <www.archive.org> on Nov. 13, 2006, <http://www.quadibloc.com/other/cfaint.htm>, 15 pages.

Color Filter Array, Wikipedia, <http://en.wikipedia.org/wiki/Color_filter_array>, printed Aug. 18, 2017 in 4 pages.

Dalsa Origin Brochure, document indicates that it was printed Apr. 2004, in 2 pages.

Dalsa Technology with Vision, Presentation, date listed Mar. 2003, pp. 35.

Digital Cinema Initiatives, LLC, Digital Cinema System Specification, date listed Jul. 20, 2005, V1.0, 176 pp.

Digital Negative (DNG) Specification, Adobe Systems Incorporated, Feb. 2005, in 50 pages.

Digital Negative (DNG) Specification, date listed Apr. 2008, 70 pp.

Doutre et al., An Efficient Compression Scheme for Colour Filter Array Images Using Estimated Colour Difference, IEEE Canadian Conference on Electrical and Computer Engineering, Apr. 22-26, 2007, pp. 24-27.

Fox, David, HD Wins Variable Acceptance Across Europe, <http://www.urbanfox.tv/articles/cameras/c11ibc2001cameras.htm>, 2001, in 7 pages.

Gamma Correction and Tone Reproduction of Scan Image, date listed Jun. 1994, in 35 pages.

Gastaldi et al., Compression of Videos Captured Via Bayer Patterned Color Filter Arrays, Signal Processing Conference, 2005 13th European, Sep. 2005, in 4 pages.

Gonzalez, Rafael C., "Digital Image Processing," Second Edition, 2002, pp. 80-84.

Handbook of Image and Video Processing, Second Edition, Elsevier Academic Press, 2005, pp. 644, 657, 739-740.

Huffman coding, Wikipedia, http://en.wikipedia.org/wiki/Huffman_coding, May 22, 2017, 11 pp.

Hydrogen—The World's First Holographic Media Machine, In Your Pocket, No Glasses Needed, Red Media Machine Hydrogen, 2017, 1 p.

Ion, Lucian, et al., High Dynamic Range Data Centric Workflow System, DALSA Digital Cinema, this paper reported to be originally presented at SMPTE Technical Conference and Exhibit, New York, date listed Nov. 2005, in 14 pages.

(56) References Cited

OTHER PUBLICATIONS

Ion, Lucian, et al., White Paper: 4K Digital Capture and Postproduction Workflow, DALSA Digital Cinema, in 5 pages.
ISO Standard 15444 (part 1): Information technology—JPEG 2000 image coding system: Core coding system, pp. i-v, xiv, 1-11, 120-122, copyright date listed is 2004.
JPEG 2000 still image coding versus other standards, date listed Jul. 2000.
Lee et al., A Novel Approach of Image Compression in Digital Cameras with a Bayer Color Filter Array, IEEE 2001, date listed 2001, pp. 482-485.
LEICA Instructions, LEICA R8, in 70 pages.
Leica R system: The analog-digital system, date listed 2005, in 40 pages.
Lian et al., Reversing Demosaicking and Compression in Color Filter Array Image Processing: Performance Analysis and Modeling, IEEE Transactions on Image Processing, vol. 15, No. 11; date listed is Nov. 2006.
Long, Ben, Real World Aperture, 2007, Chapter 3 & Chapter 6, pp. 47.
Lukac et al., Single-Sensor Camera Image Processing, Color Image Processing: Methods and Applications, Chapter 16, pp. 363-392, date listed on document is CRC Press 2006.
Lukac et al., Single-Sensor Image Compression From the End-User's Perspective, IEEE CCECE/CCGEI, May 2006, in 4 pages.
Lukac et al.: Single-sensor camera image compression, date listed May 2006, pp. 299-307.
Marino et al., Wavelet-Based Perceptually Lossless Coding of R-G-B images, Integrated Computer-Aided Engineering, date listed 2000, vol. 7, pp. 117-134.
Menon et al., On The Dependency Between Compression and Demosaicing In Digital Cinema, Visual Media Production, The 2nd IEEE European Conference, Nov. 30-Dec. 1, 2005, pp. 104-111.
Mitani, et al.; A 4 K × 2 K-pixel color image pickup system; IEICE Transactions on Information and Systems; E82D (8): 1219-1227; Aug. 1999.
Mitani, et al.; Ultrahigh-definition color video camera system with 4K-scanning lines; Sensors and Camera Systems for Scientific, Industrial, and Digital Photography Applications IV, 5017: 159-166, Published May 16, 2013.
NAB2006DayThree, archive.org indicates available on-line Mar. 2, 2007, [on-line] http://web.archive.org/web/20070302002153/http://web.mac.com/mikedcurtis/iWeb/HD4NDs_Image_Galleries/NAB2006DayThreePt1.html, in 5 pages.
New Camcorder from Silicon Imaging, © 2006-2008 Digital Camcorder News, date listed Apr. 19, 2006, in 2 pages. http://www.digitalcamcordernews.com/2006/04/new-camcorder-from-silicon-imaging).
Nordhauser, Steve, Silicon Imaging Announces World's First Digital Cinema Camera with Direct-to-Disk 10-bit CineForm RAW™ Recording and Adobe® Production Studio Integration, Silicon Imaging, Inc, Albany, New York, date listed Jun. 26, 2006, in 3 pages. (http://www.filmmakers.com/news/digital/article_713.shtml).
Notes from the field: Silicon Imaging SI-1920HDVR camera in actual use, FRESHDV, date listed May 18, 2006, in 5 pages. (http://www.freshdv.com/2006/05/notes-from-field-silicon-imaging-si.html).
Olsen et al., An improved image processing chain for mobile terminals, Graduate Thesis, Agder University College, date listed May 2002, in 71 pages.
Panasonic®, Operating Instructions: Camera-Recorder, Model No. AG-DVX100Bp, 2005, in 88 pages.
Panasonic®, Operating Instructions: Camera-Recorder, Model No. AJ-HDCZ7Hp, DVCPRO HD, 2005, in 140 pages.
Panasonic®, VariCam DVCPRO HD, Model No. AJ-HDCZ7H Variable Frame-Rate HD Camera-Recorder, 2004, in 20 pages.
Panavision®, Genesis User's Manual, Version 1.4, <http://panalab.panavision.com/sites/default/files/docs/documentLibrary/Genesis%20Users%20Manual.pdf>, 2008, in 278 pages.
Parrein et al., Demosaicking and JPEG2000 Compression of Microscopy Images, 2004 International Conference on Image Processing (ICIP), date listed 2004, pages 521-524.
Phantom 65 the world's first 65mm digital cinema, date listed Nov. 22, 2006.
Phantom 65, archive.org indicates available on-line Feb. 4, 2007, www.visionresearch.com, [online], http://webarchive.org/web/20070204110551/www.visionresearch.com/index.cfm?sector=htm/files&page=camera_65_new, pp. 1-2.
Phantom 65, Vision Research, Inc., date listed Sep. 27, 2006, in 2 pages.
Phantom HD, <http://www.alfavisionsrl.com.ar/espanol/alquiler/camera/info/manuals/DS_phantomHD.pdf>, dated Mar. 30, 2007, pp. 2.
Phantom® Digital Widescreen CinemaTM, Vision Research, date listed May 3, 2006, in 17 pages.
Poynton, Charles, A Technical Introduction to Digital Video, 1996, Ch. 6 (Gamma), pp. 91-114.
ProCam 4, Tutorials—ProCam 4, http://www.procamapp.com/tutorials.html, Jul. 5, 2017, 13 pp.
Puhovski, Nenad, [compiled by] High Definition Report from Cilect Standing Committee for New Technologies, Madrid, date listed 2006, in 146 pages.
Rabadi, Wissam, et al., "Programmable DSP Platform for Digital Still Cameras, Application Report SPRA651," Apr. 2000, in 12 pages.
Red Digital Cinema, <http://www.dvxuser.com/articles/redteam/RED-DVXUSER.pdf>, copyright date Dec. 31, 2006, pp. 2.
Red Digital Cinema, Introducing REDCODE, Sep. 2006, International Broadcasting Convention, Amsterdam, the Netherlands, in 1 page.
Red Digital Cinema, Mysterium Sensor, Sep. 2006, International Broadcasting Convention, Amsterdam, the Netherlands, in 1 page.
Red Digital Cinema, Nov. 2018, IPP2: Image pipeline stages, product brochure, 2 pp.
Red Digital Cinema, Preliminary Specifications, Apr. 14-19, 2007, Las Vegas, Nevada, in 1 page.
Red Digital Cinema, Preliminary Specifications, Sep. 2006, International Broadcasting Convention, Amsterdam, the Netherlands, in 1 page.
Red Digital Cinema, Simple. 4K to Anything, Sep. 2006, International Broadcasting Convention, Amsterdam, the Netherlands, in 1 page.
Red Digital Cinema, We decided to skip several generationas of evolution, Brochure, date listed 2006, in 2 pages.
Red Exclusive Brochure, www.dvxuser.com, retrieved on Feb. 5, 2013, in 1 page http://www.dvxuser.com/V6/archive/index.php/t-54786.html.
Red vs Dalsa Origin, reduser.net, The DSMC System, Red One, date listed Oct. 26, 2007, in 5 pages. (http://www.reduser.net/forum/archive/index.php/t-5344.html).
REDUSER Forum Thread: HYDROGEN . . . added color, http://www.reduser.net/forum/showthread.php?159552-HYDROGEN-added-color&p-=1743309#post1743309, Jul. 6, 2017, 4 pp.
Roberts et al., Television Colorimetry: A Tutorial for System Designers, Research and Development Department, Technical Resources, The British Broadcasting Corporation, Sep. 1995, pp. 19.
Roberts, A., The Film Look: It's Not Just Jerky Motion . . . , R&D White Paper, WHP 053, Research and Development, British Broadcasting Corporation, Dec. 2002, pp. 19.
Robin, Gamma Correction, www.broadcastengineering.com [online], date listed Jan. 1, 2005 in 5 pages.
Sayood, Introduction to Data Compression (Third Edition), 2006, 703 pp.
Schubert et al., 2010, A hands-on approach to high-dynamic-range and superresolution fusion, 1-8. 10.1109/WACV.2009.5403080.
Sci-Tech Awards, <http://www.oscars.org/sci-tech>, printed Oct. 2, 2017 in 11 pages.
Serial ATA International Organization: Serial ATA Revision 2.6, Feb. 15, 2007, 600 pp.

(56) References Cited

OTHER PUBLICATIONS

Shao, Vivian, "Implementing the Gamma Correction Algorithm Using the TM832002xx DSP, Application Report: SPRA361," Digital Signal Processing Solutions, Texas Instructions, Sep. 1997, in 16 pages.

SI-1920HDVR Camera Architecture, Silicon Imaging Digital Cinema, https://web.archive.org/web/20060423023557/http://www.siliconimaging.com/DigitalCinema/CameraArchitecture.html, archive.org indicates available on-line Apr. 23, 2006, in 2 pages.

SI-1920HDVR Cineform Raw workflow, Silicon Imaging Digital Cinema, https://web.archive.org/web/20060423023730/http://www.siliconimaging.com/DigitalCinema/CineformWorkflow.html, archive.org indicates available on-line Apr. 23, 2006, in 2 pages.

SI-1920HDVR FAQ, Silicon Imaging Digital Cinema, http://webarchive.org/web/20060423023601/http://www.siliconimaging.com/DigitalCinema/faq.html, archive.org indicates available on-line Apr. 23, 2006, in 5 pages.

SI-1920HDVR Key Features, Silicon Imaging Digital Cinema, https://web.archive.org/web/20060423023637/http://www.siliconimaging.com/DigitalCinema/key_features.html, archive.org indicates available on Apr. 23, 2006, in 2 pages.

SI-1920HDVR Key Features, Silicon Imaging Digital Cinema, in 2 pages. <http://www.siliconimaging.com/DigitalCinema/key_features.html>, Date retrieved Sep. 3, 2010.

SI-1920HDVR Specifications, Silicon Imaging Digital Cinema, http://web.archive.org/web/20060423023724/http://www.siliconimaging.com/DigitalCinema/full_specifications.html, archive.org indicates available on-line Apr. 23, 2006, in 2 pages.

SI-1920HDVR, Silicon Imaging Digital Cinema, http://web.archive.org/web/20060828080100/http://www.siliconimaging.com/DigitalCinema.html, archive.org indicates available on-line Aug. 28, 2006, in 2 pages.

SI-2K Digital Cinema Camera, Silicon Imaging, copyright date listed is 2007, in 14 pages. http://web.archive/org/web/20080610162715/www.siliconimaging.com Date retrieved Sep. 3, 2015.

Silicon DVR CineForm RAW, Silicon Imaging Digital Cinema, http://www.siliconimaging.com/DigitalCinema/SiliconDVR_CineFormTech.html, dated May 22, 2017, 2 pp.

Silicon Imaging SI-2K MINI Full Specifications, archive.org indicates available on-line May 23, 2007, www.siliconimaging.com, [online], http://webarchive.org/web/20070523223217/www.siliconimaging.com/DigitalCinema/SI_2K_full_specifications.html, pp. 1-2.

Silicon Imaging Support: Frequently-Asked-Questions, archive.org indicates available on-line Dec. 12, 2007, www.siliconimaging.com, [online], http://webarchive.org/web/20071212165310/www.siliconimaging.com/DigitalCinema/SiliconImaging_faq.html, in 12 pages.

Silicon Imaging Support: Frequently-Asked-Questions, Jun. 10, 2008, www.siliconimaging.com, [online], http://web.archive.org/web/20080610162715/www.siliconimaging.com/DigitalCinema/SiliconImaging_faq.html, in 14 pages.

Silicon Imaging, Press News Releases, www.siliconimaging.com/DigitalCinema/SI_Press.html, printed Nov. 5, 2012.

Silverstein et al., The Relationship Between Image Fidelity and Image Quality, as printed Sep. 7, 2004 in 5 pages.

Slone et al., Assessment of Visually Lossless Irreversible Image Compression: Comparison of Three Methods by Using an Image-Comparison Workstation, Radiology, May 2000, vol. 215, No. 2, pp. 543-553.

Smith, et al., Image Resolution of the One-CCD Palomar Motion Picture Camera, 37th Advance Motion Imaging Conference, Seattle, Washington, date listed Feb. 27-Mar. 1, 2003, in 8 pages.

Smith, et al.; Constant quality JPEG2000 rate control for digital cinema; Source: Proceedings of SPIE —The International Society for Optical Engineering, v 6508, n Part 1, 2007, Conference: Visual Communications and Image Processing 2007, Jan. 30, 2007-Feb. 1, 2007.

Some Like It Raw, Silicon Imaging D-Cinema Camera with Cineform Raw Codec, Studio Daily, date listed May 8, 2006, [on-line] http://www.studiodaily.com/2006/05/some-like-it-raw/.

Sony® Digital Camcorder, Operating Instructions, Model No. DSR-PD150, 2000, in 172 pages.

Sony®, HD Camcorder: HDW-F900, Operation Manual, 1st Edition (Revised 1), Aug. 13, 2000, in 253 pages.

Sony®, HD Color Camera: HDC1500 Series, Operation Manual, 1st Edition (Revised 8), May 13, 2008, in 65 pages.

Taubman et al., JPEG2000: Standard for Interactive Imaging, Proceedings of the IEEE, vol. 90, No. 8, Aug. 2002, in 22 pages.

Term: Compression, Visually Lossless, <http://www.digitizationguidelines.gov/term.php?term=compressionvisuallylossless>, as printed Jan. 23, 2018 in 1 page.

The Red One Camera 4K Resolution, various dates listed, starting from Feb. 7, 2007, URL:http://www.vnnforum.com/showthread.php?t=44489 [retrieved on Aug. 3, 2012].

Viper FilmStream Camera System, Product Data Sheet, A Thompson Brand, Grass Valley, 2003, in 4 pages.

Vision Research introduces the Phantom HD, http://web.archive.org/web/20060715130053/www.visionresearch.com/phantomhd.html, archive.org indicates available on-line Jul. 15, 2006, in 3 pages.

Wang et al., New Color Filter Arrays of High Light Sensitivity and High Demosaicking Performance, Powerpoint Presentation, <http://www.eecs.qmul.ac.uk/~phao/Papers/ICIP11.ppt.pdf>, IEEE International Conference on Image Processing (ICIP), Brussels, Belgium, Sep. 11-14, 2011, in 21 pages.

Wang, Jul. 6, 2017, Camera maker stoked on holographic smartphone, Red Hydrogen, https://pocketnow.com/a-camera-maker-drops-into-smartphones-with-the-red-- hydrogen, 2 pp.

Willis, Jul. 6, 2017, The Red Hydrogen One Media Player and Smartphone, The American Society of Cinematographers, https://ascmag.com/articles/the-red-hydrogen-one-media-player-and-smartph- one, 7 pp.

Wilt, Adam, Camera Log, NAB 2009—SI-2K, date listed Apr. 19,2009, in 5 pages. (http://provideocoalition.com/index.php/awilt/story/nab_2009_si_2k/).

Wu et al., Temporal Color Video Demosaicking via Motion Estimation and Data Fusion, IEEE Transactions on Circuits and Systems for Video Technology, vol. 16, No. 2, Feb. 2006, pp. 231-240.

Xie et al., A Low-Complexity and High-Quality Image Compression Method for Digital Cameras, ETRI Journal, vol. 28, No. 2, Apr. 2006, pp. 260-263.

Zeng, Jianfen, et al., Video Coding Techniques for Digital Cinema, © Jul. 2004 IEEE International Conference on Multimedia and Expo (ICME), pp. 415-418, vol. 1.

Zhang et al., Lossless Compression of Color Mosaic Images, IEEE Transactions on Image Processing, vol. 15, No. 6, Jun. 2006, pp. 1379-1388.

Zhang et al., Real-Time Lossless Compression of Mosaic Video Sequences, Aug. 10, 2005, pp. 8.

Zhu et al., Color Filter Arrays Based on Mutually Exclusive Blue Noise Patterns, Journal of Visual Communication and Image Representation, vol. 10, 1999, pp. 245-267.

Taiwanese Office Action for Application No. TW107123273, dated Dec. 15, 2021, in 16 pages.

European Office Action for Application No. EP18750283.6, dated Nov. 22, 2021, in 5 pages.

International Search Report and Written Opinion for International Application No. PCT/US2018/040804, dated Sep. 24, 2018, 18 pp.

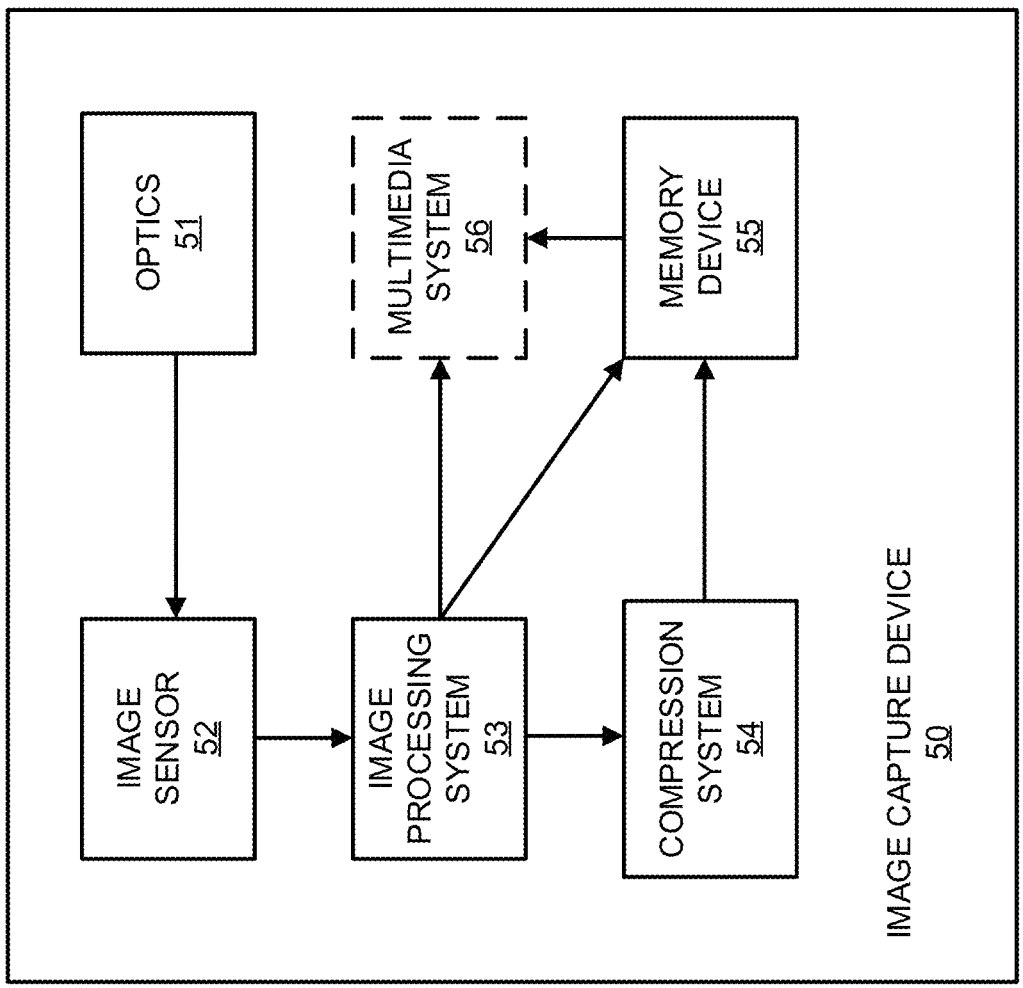

VIDEO IMAGE DATA PROCESSING IN ELECTRONIC DEVICES

CROSS-REFERENCE TO RELATED APPLICATIONS

Any and all applications for which a domestic priority claim is identified in the Application Data Sheet of the present application are hereby incorporated by reference under 37 CFR 1.57.

BACKGROUND

High-end video capture capability continues to advance. Professional cinematographers as well as increasingly large numbers of consumers are demanding high quality video recording capability, not only in traditional digital video cameras, but also in other video camera-equipped electronic devices including cellphones/smart phones, tablets, and the like.

SUMMARY

Various embodiments described herein relate to image capture devices capable of capture and on-board storage of compressed raw (for example, mosaiced according to a Bayer pattern color filter array or according to another type of color filter array), high resolution (for example, at least 2 k, 4 k, 6 k, 8 k, 10 k, or ranges of values between any of these resolution levels) video image data. The compressed raw image data can be "raw" in the sense that the video data is not "developed", such that certain image processing image development steps are not performed on the image data prior to compression and storage. Such steps can include one or more of interpolation (for example, de-Bayering or other de-mosaicing), color processing, tonal processing, white balance, and gamma correction. For example, the compressed raw image data can be one or more of mosaiced (for example, not color interpolated, not demosaiced), not color processed, not tonally processed, not white balanced, and not gamma corrected. Rather, such steps can be deferred for after storage, such as for off-board post-processing, thereby preserving creative flexibility instead of than "baking in" particular processing decisions in camera.

The image processing and compression techniques described herein can be implemented in a variety of form factors. For instance, the techniques described herein for compressing and on-board storage of compressed raw image data can be implemented in a relatively small-form factor device, such as a smart phone having an integrated camera (or multiple cameras including front camera(s) and rear camera(s), or a small form factor camera. For instance, the processing techniques according to certain embodiments are tailored for implementation in a small form factor device having relatively limited power budget, processing capability, and physical real estate for incorporation of electronic components, etc. In another example, the compression techniques described herein can be implemented in relatively larger form factor cameras, including digital cinema cameras.

According to certain aspects, an image capture device can be configured to capture raw mosaiced image data, compress the raw image data, and store the image data in on-board memory of the image capture device.

Electronics residing of the image capture device can be configured to, as part of the compression, transform the raw mosaiced image data using a discrete cosine transform (DCT) or another transform (such as a transform that defines a finite sequence of data points in terms of a sum of functions oscillating at different frequencies) to obtain transform coefficients, and compress the transform coefficients. According to some embodiments, the electronics can be configured to perform the compression without using an image frame memory (for example, a dynamic random access memory [DRAM]) that stores a full image frame for processing purposes. For instance, the electronics can compress the transform coefficients using an on-chip first memory (for example, a static random-access memory [SRAM]) that is integrated with an image processing chip (for example, an application specific integrated circuit [ASIC] or field-programmable gate array [FPGA]), and without using any second DRAM or other memory positioned off-chip.

In certain embodiments, the electronics can nonetheless include a DRAM or other second memory off-chip. However, the off-chip memory in such embodiments may used for purposes other than compression of raw video image data, such as for pixel defect correction, addressing pixel pattern noise, or the like. This is unlike existing image capture devices, such as smart phones, which use an off-chip DRAM to perform image compression. For instance, some existing image capture devices use an off-chip DRAM to calculate motion vectors for H.264 compression. Certain embodiments described herein use DCT techniques, thereby facilitating memory-efficient compression, without the need to calculate motion vectors or use off-chip memory.

Performing compression without use of a full image frame memory (for example, an off-chip DRAM) enhances power efficiency (such as, by around 0.5 Watts (W) in some implementations), which is particularly useful in a small-form factor device such as a smart phone. According to certain aspects, the electronics of the image capture device consume less than 15 W or less than about 20 W during operation.

Features disclosed herein can, in certain embodiments, provide approaches for decoding as much of a frame as possible in real time and may enable decompression at a rate faster than 24 frames per second (fps). Moreover, the approaches can, in some implementations, make extensive use of a Graphical Processing Unit (GPU) of an electronic device and permit significant parallelization of operations while enabling a high image quality to be maintained.

According to some aspects, the image capture device includes a clock configured to control a timing at which the raw mosaiced image data is processed (for instance, compressed) by electronic circuitry, and the electronic circuitry is configured to correctly process the raw mosaiced image data despite the clock stopping for a period of time. This may be at least because the raw mosaiced image data can be processed by the electronic circuitry using memory that may not require refreshing.

According to certain aspects, the image capture device is configured to transform raw mosaiced image data to obtain transform coefficients. The device quantizes the transform coefficients to obtain quantized coefficients, and encodes at least some of the quantized coefficients by performing one or more of the following: dividing each quantized coefficient into a plurality of ranges and values within the plurality of ranges; determining a Huffman code for each quantized coefficient according to an individual range in which each quantized coefficient is included; and determining a Golomb code for each quantized coefficient according to an individual value within the individual range in which each quantized coefficient is included.

In some embodiments, an electronic device is disclosed. The electronic device includes a housing, an image sensor, a memory device, and one or more processors. The image sensor can generate image data from light incident on the image sensor. The one or more processors can: transform the image data to obtain transform coefficients, quantize the transform coefficients to obtain quantized transform coefficients including a first quantized transform coefficient and a second quantized transform coefficient different from the first quantized transform coefficient, encode the quantized transform coefficients to obtain encoded coefficients, and store the encoded coefficients to the memory device. The quantized transform coefficients can be encoded at least by: determining a first range of a plurality of ranges in which the first quantized transform coefficient is included, determining a second range of the plurality of ranges in which the second quantized transform coefficient is included, determining a first value within the first range to which the first quantized transform coefficient corresponds, determining a second value within the second range to which the second quantized transform coefficient corresponds, encoding, using a first algorithm, the first range as a first range code and the second range as a second range code, and encoding, using a second algorithm different from the first algorithm, the first value as a first value code and the second value as a second value code. The encoded coefficients can include the first range code, the second range code, the first value code, and the second value code.

The electronic device of the preceding paragraph can include one or more of the following features: The first algorithm is a Huffman code, or the second algorithm is a Golomb code. The one or more processors can vary the first algorithm during processing of the image data. The one or more processors can vary the first algorithm from processing a first frame of the image data to processing a second frame of the image data. The second algorithm can remain constant during processing of the image data by the one or more processors. The quantized transform coefficients can include a third quantized transform coefficient different from the first quantized transform coefficient and the second quantized transform coefficient, and the one or more processors can encode the quantized transform coefficients by at least: determining a third range of a plurality of ranges in which the third quantized transform coefficient is included, not determining a third value within the third range to which the third quantized transform coefficient corresponds, and encoding, using the first algorithm, the third range as a third range code, the encoded coefficients comprising the third range code. The one or more processors can transform the image data using a discrete cosine transform. The discrete cosine transform can be a 16×16 discrete cosine transform. The one or more processors can encode the quantized transform coefficients at least by encoding DC coefficients of the quantized transform coefficients differently from AC coefficients of the quantized transform coefficients. The one or more processors can store a parameter for the first algorithm in a frame header for the encoded coefficients. The one or more processors can quantize the transform coefficients by at least using a first quantization table for green pixels of the image data and a second quantization table for red pixels and blue pixels of the image data, the first quantization table being different from the second quantization table. The image data can be moasiced image data. The image data can be raw moasiced image data. The housing can be a mobile phone housing, and the mobile phone housing can support the image sensor, the memory device, and the one or more processors. The housing can enclose the image sensor, the memory device, and the one or more processors, and the housing can removably attach to a mobile phone. The electronic device can further include a display configured to present holographic images generated by the one or more processors from the image data.

In some embodiments, a method of coding image data using an electronic device is disclosed. The method can include: generating, by an image sensor, image data from light incident on an image sensor; transforming, by one or more processors, the image data to obtain transform coefficients; quantizing, by the one or more processors, the transform coefficients to obtain quantized transform coefficients including a first quantized transform coefficient and a second quantized transform coefficient different from the first quantized transform coefficient; determining, by the one or more processors, a first range of a plurality of ranges that includes the first quantized transform coefficient and a second range of the plurality of ranges that includes the second quantized transform coefficient; determining, by the one or more processors, a first value within the first range that corresponds to the first quantized transform coefficient and a second value within the second range that corresponds to the second quantized transform coefficient; encoding, by the one or more processors, the first range as a first range code and the second range as a second range code; encoding, by the one or more processors, the first value as a first value code and the second value as a second value code; and storing the first range code, the second range code, the first value code, and the second value code to the memory device.

The method of the preceding paragraph can include one or more of the following features: The encoding the first and second ranges and the encoding the first and second values can be performed using lossless compression. The encoding the first and second ranges and the encoding the first and second values can be performed using variable length coding. The method can further include: retrieving the first range code, the second range code, the first value code, and the second value code from the memory device; and decoding, by the one or more processors, the first range code, the second range code, the first value code, and the second value code to obtain the first range, the second range, the first value, and the second value. The first range and the second range can be encoded as the first range code and the second range code using a Huffman code, or the first value and the second value can be encoded as the first value code and the second value code using a Golomb code. The transforming the image data can be performed using a 16×16 discrete cosine transform.

While certain embodiments are described with respect to specific resolutions (for example, at least 2 k or at least 4 k) or frame rates (for example, at least 23 frames per second), such embodiments are not limited to those frame rates or resolution levels. For instance, depending on the embodiment (for example, depending on sensor size) the techniques for on-board storage of compressed raw image data described herein can be capable of achieving resolution levels of at least 2 k, 3 k, 4 k, 4.5 k, 5 k, 6 k, 8 k, 10 k, 12 k, 15 k, 20 k, or greater resolution levels, or resolution levels between and inclusive of any of the foregoing resolution levels (for example, between and inclusive of 4 k and 12 k). Similarly, depending on the embodiment, the techniques for on-board storage of compressed raw image data described herein can be capable of capturing or storing image data at frame rates of at least 23, 24, 25, 120, 150, or 240 or greater fps, or of frame rates between and inclusive of any of the foregoing resolution levels (for example, between and inclusive of 23 fps and 120 fps).

BRIEF DESCRIPTION OF THE DRAWINGS

FIGS. 3A and 3B illustrate components of an example image capture device, such as the phone of FIG. 1A, the camera module of FIG. 1C, or the video camera of FIG. 2.

DETAILED DESCRIPTION

I. Introduction

This disclosure describes, among other features, approaches for compressing video image data, such as raw Bayer data. The approaches desirably can, in certain embodiments, enable compression of the video image data using several lines of on-chip memory and without using a frame memory like DRAM. The compressed size of the video image data can be set and targeted for individual frames and adapted from frame-to-frame. Moreover, the approaches can provide a hardware-friendly implementation that enables a reduction in size and power consumption for devices which compress video image data. As a result, certain features of this disclosure can be particularly desirable for relatively smaller or low-power handheld devices, such as smart phones, where it may be desirable to save high quality video while limiting power consumption and system size. In some embodiments, such techniques can be used to compress fully-processed YUV data rather than raw.

Although the electronic devices described herein may be primarily described in the context of a smart phone, the disclosures are applicable to any of a variety of electronic devices with or without cellphone functionality, including digital still and motion cameras, personal navigation devices, mobile internet devices, handheld game consoles, or devices having any or a combination of the functions or other functions.

II. Electronic Device System Overview

Figure 1B:
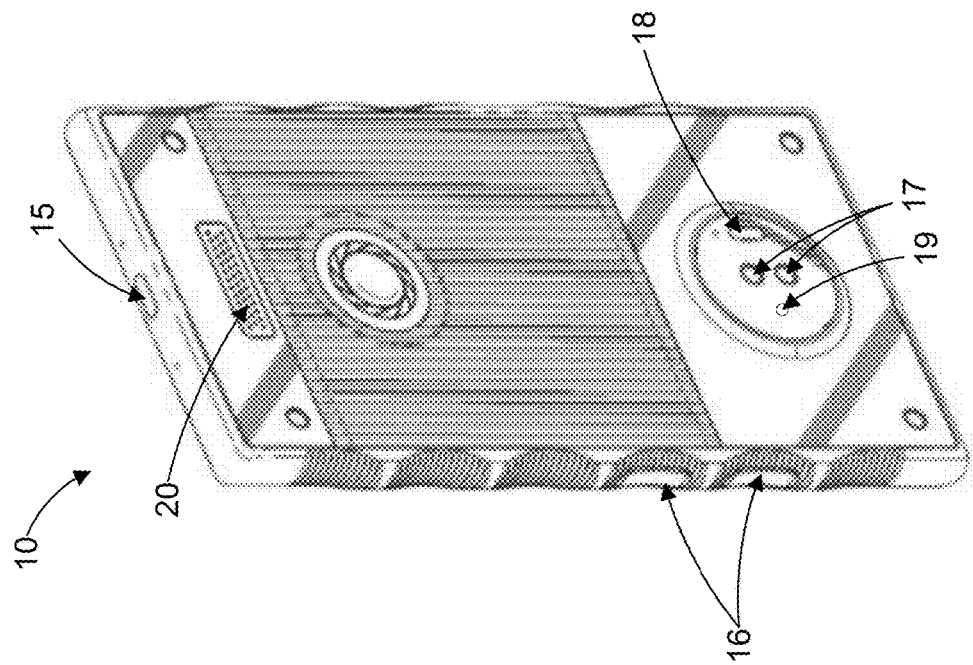
FIG. 1B illustrates a bottom, rear, and right-side perspective view of the phone of FIG. 1A.
Figure 1A:
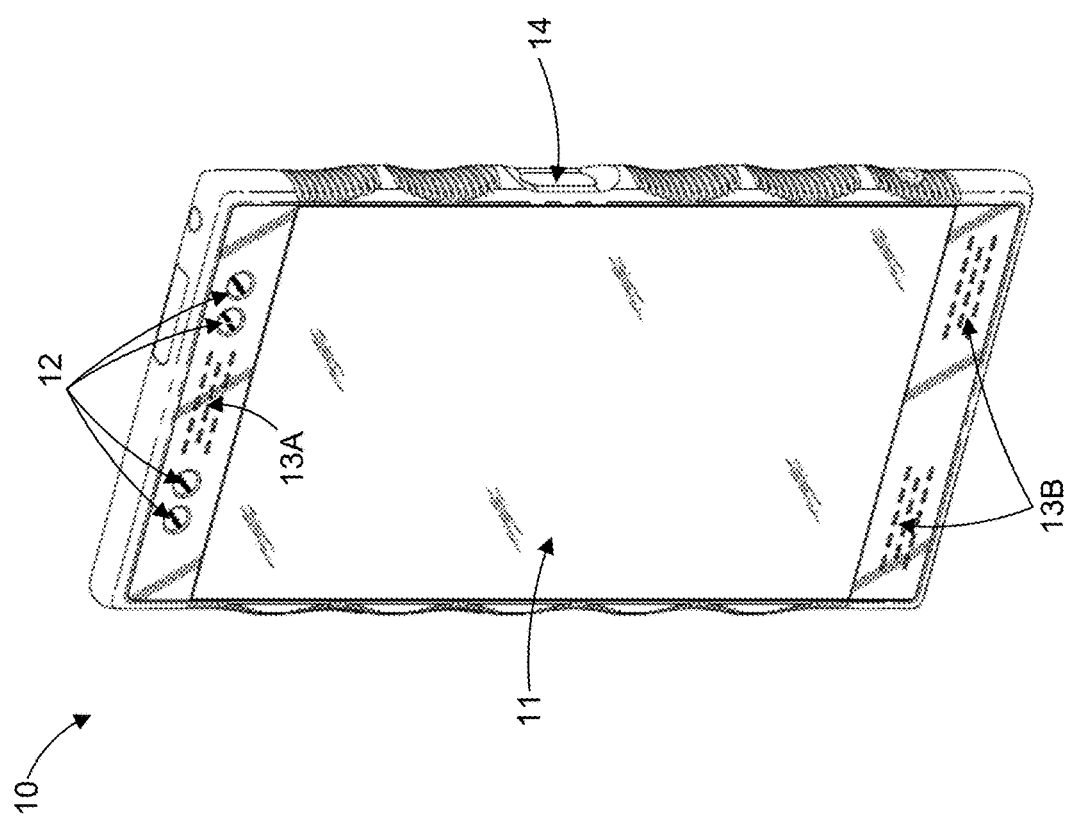
FIG. 1A illustrates a top, front, and left-side perspective view of an example phone.

FIG. 1A illustrates a top, front, and left-side perspective view of a phone 10 that may implement one or more of the compression techniques or other features described herein. The phone 10 can be a smart phone. The front of the phone 10 includes a display 11, cameras 12 (for instance, four cameras as illustrated), a first speaker grill 13A, and second speaker grills 13B, as well as one or more microphones (not shown). The left side of the phone 10 includes a first input 14.

FIG. 1B illustrates a bottom, rear, and right-side perspective view of the phone 10. The bottom of the phone includes a power input port 15. The left side of the phone 10 includes second inputs 16. The back of the phone 10 includes second cameras 17 (for instance, two cameras as illustrated), a flash 18, a laser focus 19, and a module connector 20.

The display 11 can display a variety of applications, functions, and information and may also incorporate touch screen control features.

Each of the first cameras 12 and the second cameras 17 includes a capability for capturing video image data frames with various or adjustable resolutions and aspect ratios as described herein. The first cameras 12 can each generally face the same direction as one another, and the second cameras 17 can generally face the same direction as one another.

The first input 14 and the second inputs 16 can be buttons and receive user inputs from a user of the phone 10. The first input 14 can, for example, function as a power button for the phone 10 and enable the user to control whether the phone 10 is turned on or off. Moreover, the first input 14 may serve as a user identification sensor, such as a finger print sensor, that enables the phone 10 to determine whether the user is authorized to access the phone 10 or one or more features of or files stored on the phone 10 or a device coupled to the phone 10. The first input 14 can function as a device lock/unlock button, a button to initiate taking of a picture, a button to initiate taking of a video, or select button for the phone 10. The second inputs 16 can function as a volume up button and a volume down button for the phone 10. The functionality of the first input 14 and the second inputs 16 can be configured and varied by the user. Moreover, the side of the phone 10 can include scalloped or serrated edges as illustrated in FIG. 1A and as described in U.S. Pat. No. 9,917,935; the entire disclosure of which is incorporated herein by reference. Notably, the scallop in which the first input 14 is positioned may not include serrations while the other scallops may include serrations, which can assist a user with distinguishing the two edges of the phone 10 from one another, as well as the first input 14 from the second inputs 16.

The phone 10 may receive no user inputs to the front of the phone 10 except via the display 11, in some embodiments. The front of the phone 10 thus may include no buttons, and any buttons may be located on one or more sides of the phone 10. Advantageously, such a configuration can, in certain embodiments, improve the ergonomics of the phone 10 (such as by enabling a user to not have to reach down to a front button) and increase an amount of space available for the display 11 on the phone 10.

The module connector 20 can interchangeably couple with a module and receive power or data from or transmit power or data to the module or one or more other devices coupled to the module. The module can include a camera, a display, a video game controller, a speaker, a battery, an input/output expander, a light, a lens, a projector, and combinations of the same and the like. The module moreover may be stacked to one or more other module to form a series of connected modules coupled to the phone 10, such as described in U.S. Patent Application Publication No. 2017/0171371; the entire disclosure of which is incorporated herein by reference.

The module connector 20 can include multiple contacts (for instance, 44 contacts in three rows or 13 contacts in one row, among other possibilities) that engage with contacts on a corresponding connector of a module to electronically communicate data. The multiple contacts can engage with a spring loaded connector or contacts of the module. In some implementations, the phone 10 can magnetically attach to or support the module, and the phone 10 and the module can each include magnets that cause the phone 10 to be attracted and securely couple. The phone 10 and the module can further be coupled in part via a friction fit, interlocking structures, fasteners, mechanical snap surface structures, mechanical latch surface structures, mechanical interference fit surface structures, or the like between one or more portions of the phone 10 and one or more portions of the module.

Additional information about coupling of and communicating data between a device and one or more modules can be found in U.S. Patent App. Pub. Nos. 2017/0171371 and 2016/0044148 and U.S. Pat. No. 9,568,808; the disclosures of which are herein incorporated by reference in their entirety.

The dimensions of the phone 10 can vary depending on the particular embodiment. For example, the phone 10 can be approximately 100 mm high by 50 mm wide by 15 mm thick. In another example, the phone 10 can be about 150 mm in height, 70 mm wide and 10 mm thick. In yet another example, the phone 10 can be about 130 mm high, by 70 mm wide by 10 mm thick. In yet a further example, the phone 10 can be approximately 120 mm high by 60 mm wide by 10 mm thick. The display 11, for instance, can be a 4", 4.5", 5", 5.5", 5.7", 6", 6.5", 7", or 7.5" display.

Figure 1D:
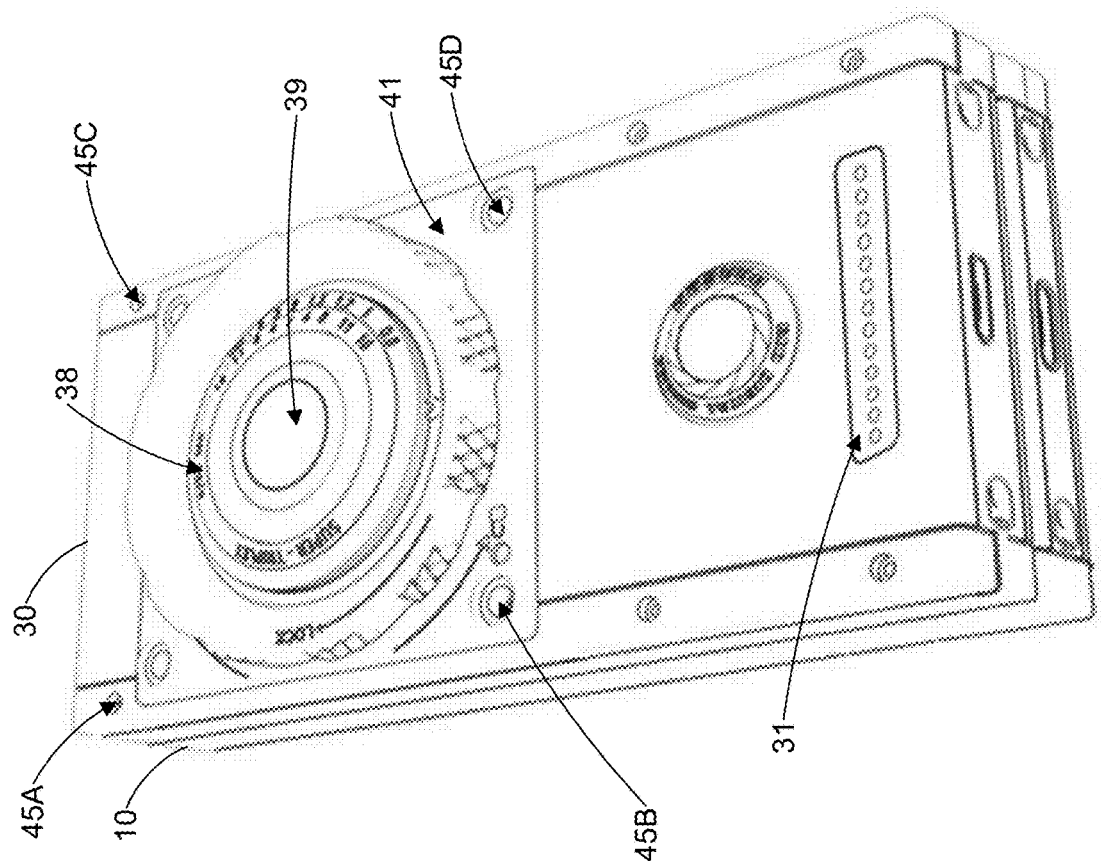
FIG. 1D illustrates a perspective view of the phone of FIG. 1A and the camera module of FIG. 1C when attached.
Figure 1C:
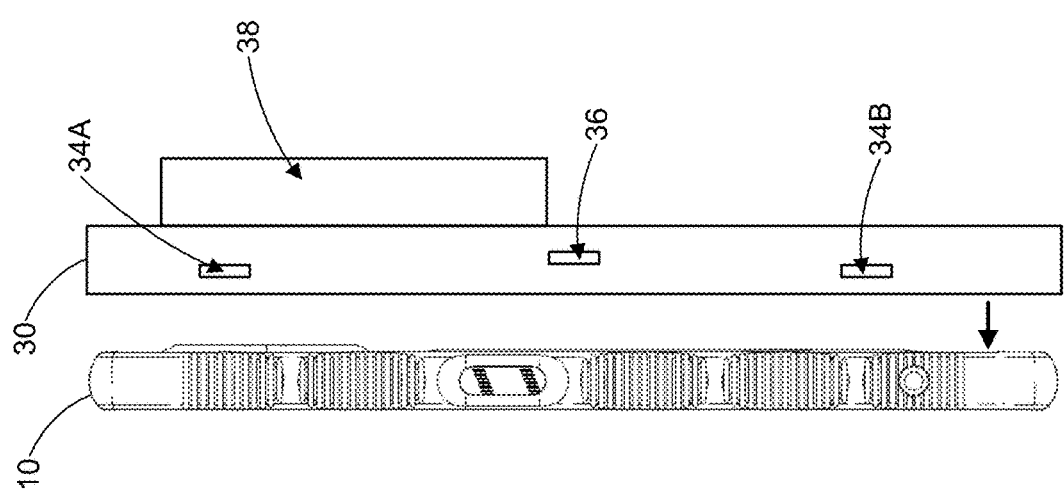
FIG. 1C illustrates a side view of the phone of FIG. 1A positioned for attachment to an example camera module.

FIG. 1C illustrates a side view of the phone 10 positioned for attachment to a camera module 30, and FIG. 1D illustrates a perspective view of the phone 10 and the camera module 30 when attached. The camera module 30, alone or in combination with the phone 10, can implement one or more of the compression techniques or other features described herein. The camera module 30 can include a housing that supports magnets 34A and 34B and an input 36. The magnets 34A and 34C can facilitate coupling of the housing to the phone 10. The input 36 can be used to receive user inputs to the camera module 30 to control activities of the camera module 30 like changing of a mode or initiating capture of video. Although not illustrated in FIGS. 1C and 1D, the camera module 30 can also include magnets on an opposite side of the housing of the camera module 30 from the side shown in FIG. 1C to couple the opposite side to the housing of the phone 10.

The camera module 30 can further couple to an optical module 38 that may be interchangeable with one or more other optical modules. The optical module 38 can, for example, include one or more optical elements such as lenses, shutters, prisms, mirrors, irises, or the like to form an image of an object at a targeted location. Embodiments of camera modules and optical modules and approaches for coupling the camera modules and optical modules are further described in U.S. Patent Application Publication No. 2017/0171371; the entire disclosure of which is incorporated herein by reference.

The optical module 38 can include a removable lens 39 and a lens mount 41, where the lens 39 may be inserted into an opening (not shown) of the lens mount 41, and then rotated to secure the lens in place. In one embodiment, the lens mount 41 can include a button or other type of control, allowing for removal of the lens 39. For instance, the user can push or otherwise interact with an interface element which allows the user to rotate the lens 39 in the opposite direction and remove the lens 39 from the opening of the lens mount 41. In some embodiments, the lens mount 41 itself is removable and re-attachable via holes 45A, 45B, 45C, 45D, for example, by inserting a mounting screw through each hole. The lens mount 41 or the lens 39 can, for example, be one of those described in U.S. Pat. No. 9,568,808, which is hereby incorporated by reference in its entirety.

The camera module 30 can include a module connector 31, similar to or the same as the module connector 20, that can interchangeably couple with an additional module (for example, engage with contacts on a corresponding connector of the additional module) and receive power or data from or transmit power or data to the module or one or more other devices coupled to the module. The additional module can include a camera, a display, a video game controller, a speaker, a battery, an input/output expander, a light, a lens, a projector, or combinations of the same and the like. In one example, the additional module connected to the module connector 31 can be an input/output expander and include one or more additional inputs that enable a user to control operations of the camera module 30. The additional module moreover may have a form factor that permits coupling of a corresponding connector of the additional module to the module connector 31 without the additional module impeding placement or use of the lens mount 41 or obstructing a view through the lens 39 from an image sensor in the camera module 30 (for example, the additional module may not cover the entire surface of the camera module 30 that includes the module connector 31). In some implementations, the additional module can magnetically attach to or be supported by the camera module, and the additional module and the camera module 30 can each include magnets that cause the two to be attracted and securely couple. Additionally or alternatively, coupling can be achieved at least via a friction fit, interlocking structures, fasteners, mechanical snap surface structures, mechanical latch surface structures, mechanical interference fit surface structures, or the like.

Figure 2:
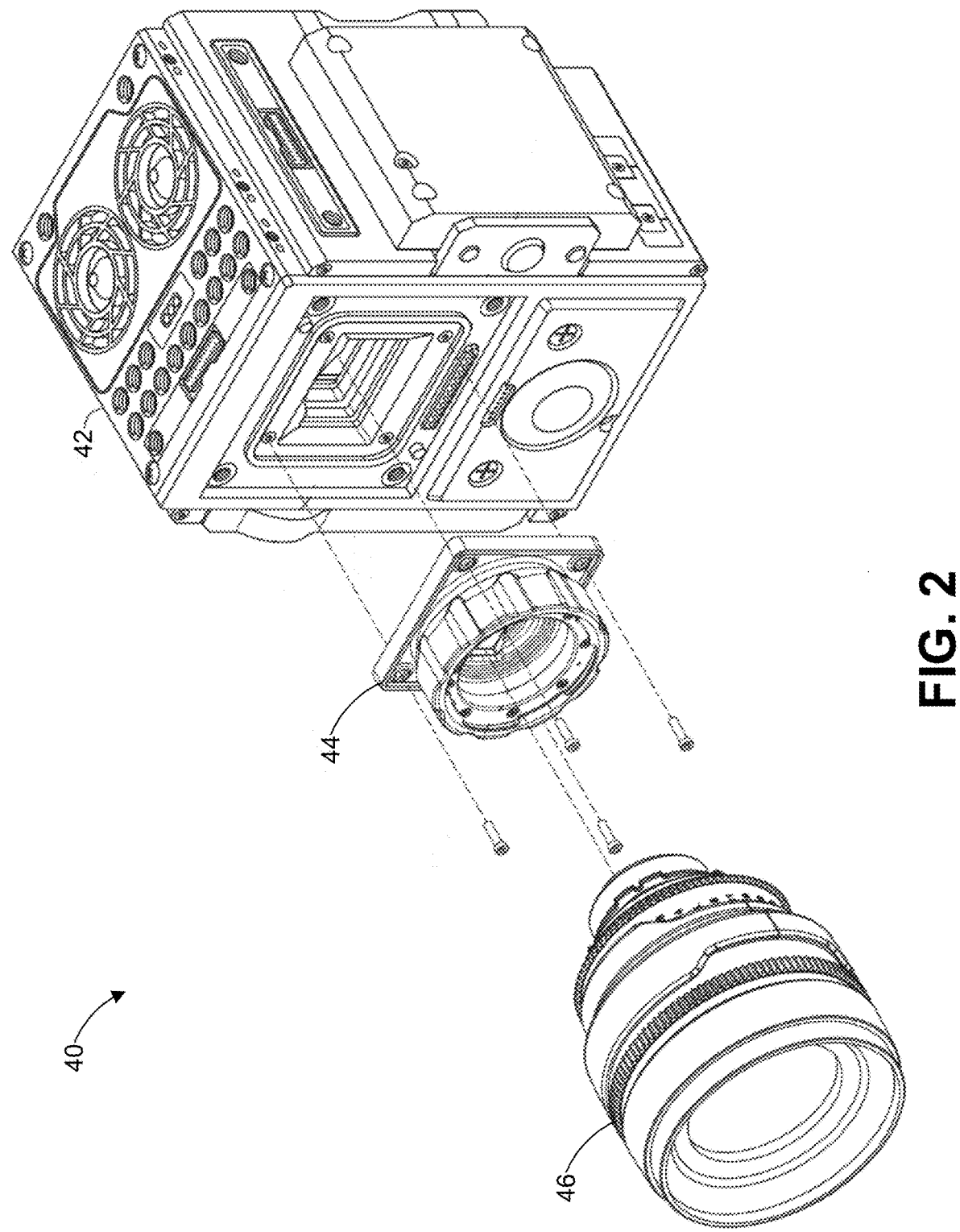
FIG. 2 illustrates a perspective view of an example video camera.

FIG. 2 illustrates a perspective view of a video camera 40. The video camera 40 can include a brain module 42, a lens mount module interface 44, and a lens 46. The video camera 40 can implement one or more of the compression techniques or other features described herein. Embodiments of the video camera 40 and its components are described in greater detail in in U.S. Patent Application Publication Nos. 2016/0295096 and 2017/0171371; the entire disclosures of which are incorporated herein by reference.

FIG. 3A illustrates an image capture device 50 that can implement one or more of the compression techniques or other features described herein. The image capture device 50, in some embodiments, can be or incorporated as part of the phone 10, the camera module 30, or the video camera 40. The image capture device 50 can include a housing configured to support optics 51, an image sensor 52 (or multiple image sensors), an image processing system 53, a compression system 54, and a memory device 55. In some implementations, the image capture device 50 can further include a multimedia system 56. The image sensor 52, the image processing system 53, the compression system 54, and the multimedia system 56 may be contained within the housing during operation of the image capture device 50. The memory device 55 can be also contained or mounted within the housing, mounted external to the housing, or connected by wired or wireless communication external to the image capture device 50.

The optics 51 can be in the form of a lens system having at least one lens configured to focus an incoming image onto the image sensor 52. In some embodiments, the optics 51 can be in the form of a multi-lens system providing variable zoom, aperture, and focus. The optics 51 can be in the form of a lens socket supported by the housing and receive multiple different types of lens systems for example, but without limitation, the optics 51 can include a socket configured to receive various sizes of lens systems including a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, or any other lens. As noted above, the optics 51 can be configured such that images can be focused upon a light-sensitive surface of the image sensor 52 despite which lens is attached thereto. Additional information regarding such a lens system can be found in U.S. Pat. No. 9,568,808, the entire disclosure of which is herein incorporated by reference.

The image sensor 52 can be any type of video sensing device, including, for example, but without limitation, CCD, CMOS, vertically-stacked CMOS devices such as the Foveon® sensor, or a multi-sensor array using a prism to divide light between the sensors. The image sensor 52 can further include a color filter array such as a Bayer pattern filter that outputs data representing magnitudes of red, green, or blue light detected by individual photocells of the image sensor 52. In some embodiments, the image sensor 52 can include a CMOS device having about 12 million photocells. However, other size sensors can also be used. In some configurations, video camera 10 can be configured to output video at "2 k" (e.g., 2048×1152 pixels), "4 k" (e.g., 4,096× 2,540 pixels), "4.5 k," "5 k," "6 k," "8 k", or "16 k" or greater resolutions. As used herein, in the terms expressed in the format of "xk" (such as "2 k" and "4 k" noted above), the "x" quantity refers to the approximate horizontal resolution. As such, "4 k" resolution corresponds to about 4000 or more horizontal pixels and "2 k" corresponds to about 2000 or more pixels. Using currently commercially available hardware, the image sensor 52 can be as small as about 0.5 inches (8 mm), but it can be about 1.0 inches, or larger. Additionally, the image sensor 52 can provide variable resolution by selectively outputting only a predetermined portion of the image sensor 52. For example, the image sensor 52 or the image processing system 53 can be configured to allow a user to identify, configure, select, or define the resolution of the video data output. Additional information regarding sensors and outputs from sensors can be found in U.S. Pat. No. 8,174,560, the entire disclosure of which is herein incorporated by reference.

The image processing system 53 can format the data stream from the image sensor 52. The image processing system 53, for instance, can separate the green, red, and blue image data into three or four separate data compilations. For example, the image processing system 53 can be configured to separate the red data into one red channel or data structure, the blue data into one blue channel or data structure, and the green data into one green channel or data structure. The image processing system 53 may also separate the green into two separate green data structures in order to preserve the disparity between the diagonally adjacent green pixels in a 2×2 Bayer pattern. The image processing system 53 can process the picture element values to combine, subtract, multiply, divide, or otherwise modify the picture elements to generate a digital representation of the image data.

The image processing system 53 can further include a subsampling system configured to output reduced or unreduced resolution image data to multimedia system 56. For example, such a subsampling system can be configured to output image data to support 6K, 4K, 2K, 1080p, 720p, or any other resolution. Additionally, the image processing system 53 can include other modules or perform other processes, such as gamma correction processes, noise filtering processes, and the like. Examples of functionality provided by the image processing system 53 are described in U.S. Patent Application Pub. No. 2014/0226036, which is incorporated herein by reference in its entirety.

Figure 7:
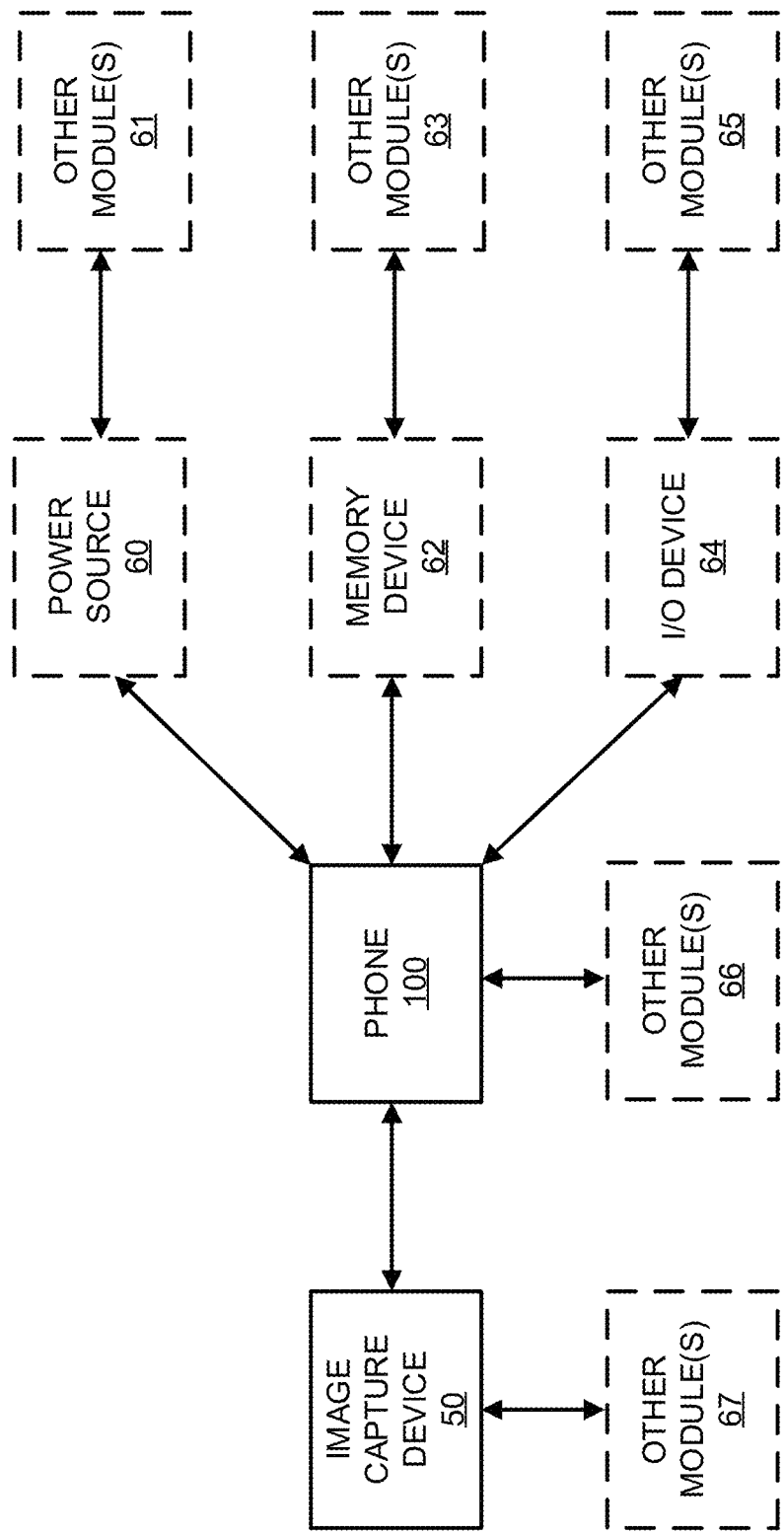
FIG. 7 illustrates the image capture device of FIG. 3A in communication with an example phone, such as the phone of FIG. 1A.

The compression system 54 can compress the image data from the image processing system 53 using a compression technique, such as the compression approach described with respect to FIG. 7, or another technique. The compression system 54 can be in the form of a separate chip or chips (for example, FPGA, ASIC, etc.). The compression system 54 can be implemented with software and another processor or can be implemented with a combination of processors, software, or dedicated chips. For example, the compression system 54 can include one or more compression chips that perform a compression technique in accordance with DCT-based codecs.

The compression system 54 can compress the image data from the image processing system 53 using DCT-based codecs with rate control. In some embodiments, the compression system 54 performs a compression technique that modifies or updates compression parameters during compression of video data. The modified or updated compression parameters can be configured to achieve targeted or desired file sizes, video quality, video bit rates, or any combination of these. In some embodiments, the compression system 54 can be configured to allow a user or other system to adjust compression parameters to modify the quality or size of the compressed video output by the compression system 54. For example, the image capture device 50 can include a user interface (not shown) that allows a user to input commands that cause the compression system 54 to change compression parameters.

The compression system 54 can compress the image data from the image processing system 53 in real time. The compression system 54 can perform compression using a single-pass to compress video frames. This can be used to eliminate the use of an intermediate frame memory used in some compression systems to perform multiple compression passes or to compress a current video frame based on the content from one or more previous video frames stored in an intermediate frame memory. This can reduce the cost or complexity of a video camera with on-board video compression. The compression system 54 can compress image data from the image processing system 53 in real time when the frame rate of the image data is at least 23 frames per second (fps), at least about 24 fps (e.g., 23.976 fps), at least about 25 fps, at least about 30 fps (e.g., 29.97 fps), at least about 48 fps, at least about 50 fps, at least about 60 fps (e.g., 59.94 fps), at least about 120 fps, at least about 240 fps, or less than or equal to about 240 fps. The compressed video can then be sent to the memory device 55.

The memory device 55 can be in the form of any type of digital storage, such as, for example, but without limitation, hard disks, flash memory, or any other type of memory. In some embodiments, the size of the memory device 55 can be sufficiently large to store image data from the compression system 54 corresponding to at least about 30 minutes of video at 12 megapixel resolution, 12-bit color resolution, and at 60 fps. However, the memory device 55 can have any size.

In embodiments that include the multimedia system 56, the multimedia system 56 can allow a user to view video images captured by the image sensor 52 during operation or video images received from the compression system 54 or the memory device 55. In some implementations, the image processing system 53 can include a subsampling system configured to output reduced resolution image data to the monitor system 56. For example, such a subsampling system can be configured to output video image data to support "2 k," 1080p, 720p, or any other resolution. Filters used for de-mosaicing can also be adapted to perform down-sampling filtering, such that down-sampling and filtering can be performed at the same time. The multimedia system 56 can perform any type of decompression or de-mosaicing process to the data from the image processing system 53. For example, the multimedia system 56 can decompress data that has been compressed as described herein. Thereafter, the multimedia system 56 can output a de-mosaiced or decompressed image data to a display of the multimedia system 56 or another display.

Figure 3B:
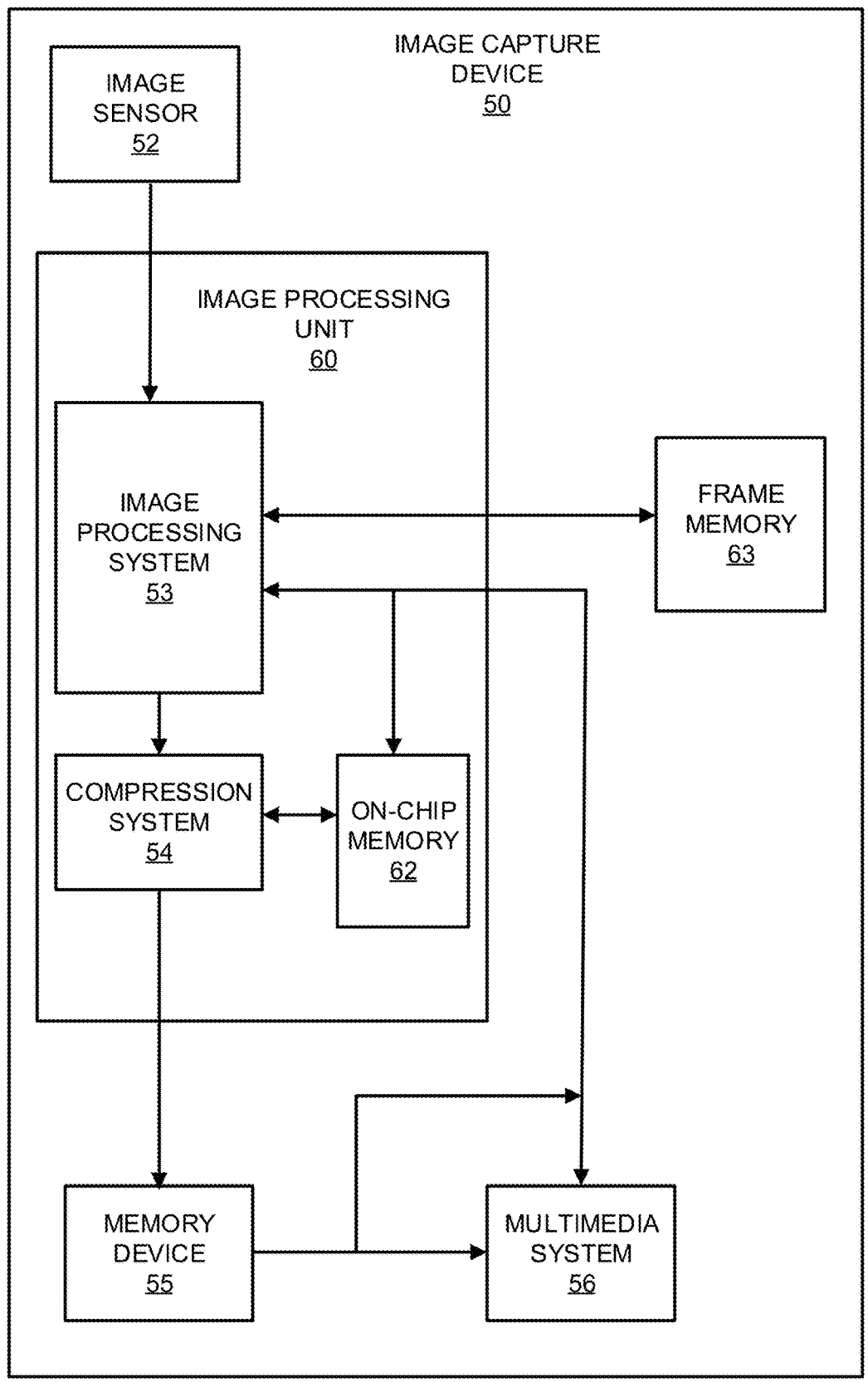

FIG. 3B illustrates additional components of the image capture device 50 according to some embodiments. FIG. 3B, in particular, depicts more implementation details of an embodiment of the image capture device 50 than FIG. 3A. As illustrated, the image capture device 50 is further in communication with frame memory 63. The frame memory 63 can be DRAM, such as the RAM 113 of FIG. 4.

The image capture device 50 further includes an image processing unit 60. As shown, the image processing unit 60 can include the image processing system 53, the compression system 54, and on-chip memory 62. The on-chip memory can, for example, be SRAM. Some or all of the components of the image processing unit 60 can be dedicated to use for processing and storage of image data (for example, compressed raw video image data) captured by the image capture device 50, and may not be used for other purposes, such as for implementing telephone functionality associated with the image capture device 50.

The image processing unit 60 can include one or more integrated circuits, chips or chipsets which, depending on the implementation, can include an application specific integrated circuit (ASIC), a field programmable gate array (FPGA), a combination thereof, or the like. According to certain embodiments, the on-chip memory 62 can be located within the same device (for example, ASIC, FPGA, or other chip[s]) as other components of the image processing unit 60, such as the image processing system 23 and compression system 54. For instance, the image processing unit 60 can include an ASIC or FPGA which implements the image processing system 53, the compression system 54, and the on-chip memory 62. The on-chip memory 62 can therefore be referred to as an "on-chip" memory according to certain embodiments, whereas the frame memory 63 can be referred to as an "off-chip" memory.

As shown, the frame memory 63 can be implemented separate from the image processing unit 60 and can be a DRAM. For instance, in one embodiment, the frame memory 63 and image processing unit 60 are respectively an ASIC and FPGA implemented in separate packages and mounted on a common printed circuit board. The frame memory 63 can be used to concurrently store an entire image frame (for example, all or substantially all of the pixel data of one image frame) for processing purposes. For instance, the frame memory 63 can be used by the image processing system 53 for storing entire image frames during certain image processing steps, such as pixel defect correction or pixel pattern noise correction as a couple of examples. While the frame memory 63 may be used for some such steps, according to certain embodiments, the image capture device 50 implements an image processing pipeline in which compressed raw video image data is processed without utilizing the frame memory 63 for the purposes of compression. For instance, the compression system 54 in some embodiments implements a DCT-based compression scheme, which can be any of those described herein, such as with respect to FIG. 6. Such a DCT-based compression scheme can be relatively lightweight in memory requirements, such that the compression system 61 can perform the compression utilizing the on-chip memory 62 and not the frame memory 63 or any other frame memory during compression.

Avoiding use of frame memory during compression can significantly reduce power consumption, and contrasts with certain other compression techniques which involve the use of a frame memory for motion vector calculations. For instance, according to certain DCT-based compression techniques described herein, the compression system 54 operates on a discrete section of a video image frame (for example, a section smaller than a full image frame) at any given time, discards the discrete section of the video image frame immediately after processing. For instance, in one embodiment, the compression system 54 operates on data for 32 horizontal lines of pixels at a time, and only utilizes an amount of storage in the on-chip memory 62 corresponding to 64 lines of pixel data for compression purposes (to hold image data for 32 lines of pixel data currently being compressed and to hold image data for the next 32 lines to be compressed). Depending on the embodiment, power consumption can be reduced such that, according to various embodiments the image capture device 50 consumes less than about 15 or 20 W during operation, and in some embodiments consumes between about 10 W to 20 W, between about 10 W to 25 W, or between about 5 W to 25 W. For instance, according to some embodiments the imaging componentry of the image processing device 50 (for example, the camera-related componentry of the image processing device 50) consumes less than about 10 W or 15 W (for example, between about 4 W to 10 W or between about 6 W 10 W), whereas the remaining non-imaging componentry (for example, phone componentry, display componentry, etc.) consumes less than about 10 W (for example, between about 3 W to 10 W or between about 5 W 10 W).

The compression techniques described herein can allow for enhanced decoding/decompression speeds. For instance, the DCT-based raw compression techniques can allow for enhanced decompression because DCT algorithms allow for use of highly parallelized mathematical operations during decompression, making efficient use of graphics processing units. Depending on the embodiment, the raw compression techniques described herein can allow for decompression of video image frames in less than or equal to about $\frac{1}{23}$, $\frac{1}{24}$, $\frac{1}{25}$, or $\frac{1}{120}$ seconds, which can allow for real-time decompression, depending on the frame rate.

III. Image Data Processing

Figure 4:
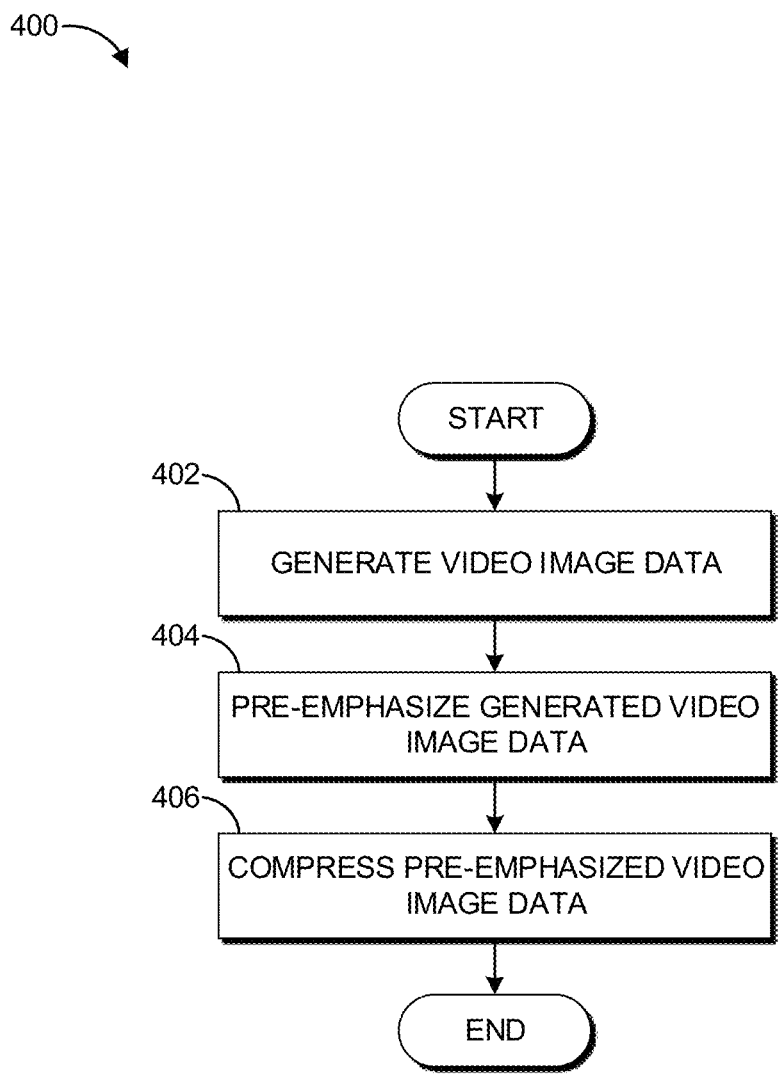
FIG. 4 illustrates an example process for processing image data that is performable by an image capture device, such as the image capture device of FIG. 3A.

FIG. 4 is a flowchart 400 illustrating an example process for processing video image data that is performable by an image capture device, such as the phone 10, the camera module 30, the video camera 40, or the image capture device 50. The flowchart 400 can represent a control routine stored in a memory device, such as the memory device 55, the ROM 112, RAM 113, or memory 175. Additionally, a processor, such as the controller 110, can be configured to execute the control routine. For convenience, the flowchart 400 is described in the context of the image capture device 50 but may instead be implemented by other systems described herein or other appropriate computing systems not shown. The flowchart 400 advantageously, in certain embodiments, depicts an example approach by which a relatively small or low-power handheld device like a cellphone can process video image data.

At block 402, the image sensor 52 can generate video image data responsive to light incident on the image sensor 52. For example, the image sensor 52 can generate the video image data as raw mosaiced image data at least at about 23 frames per second and with a resolution of at least 2K. Moreover, the output from the one or more image sensors 202 can in some implementations each be at least 16-bit wide with 15-bit outputs and 1 bit set for black sun effect. The image sensor 52 can, in some instances, be used to generate 3D video image data for processing and eventual presentation as 3D video images.

At block 404, the image processing system 53 can pre-emphasize the video image data generated by the image sensor 52. The generated video image data can be pre-emphasized by performing a lossy transform to raw pixels of the generated video image data. The pre-emphasis can desirably, in certain embodiments, reduce an amount of video image data to be processed at block 406 while nonetheless preserving video image data quality.

The image processing system 53 can, for example, perform a piecewise linear function to that transforms the raw pixels from 15-bit or 16-bit data to 12-bit data. The slope of the piecewise linear function can follow a harmonic progression $1, \frac{1}{2}, \frac{1}{3}, \ldots, \frac{1}{15}, \frac{1}{16}$ and change every 256 counts. The shape of the piecewise linear function can be tailored to the image sensor 52 from sensor characterization data and thus vary from sensor to sensor or sensor manufacturer to sensor manufacturer. The input range of the piecewise linear function may, in some instances, go above a maximum value permitted to account for a black offset that may be applied.

Figure 5:
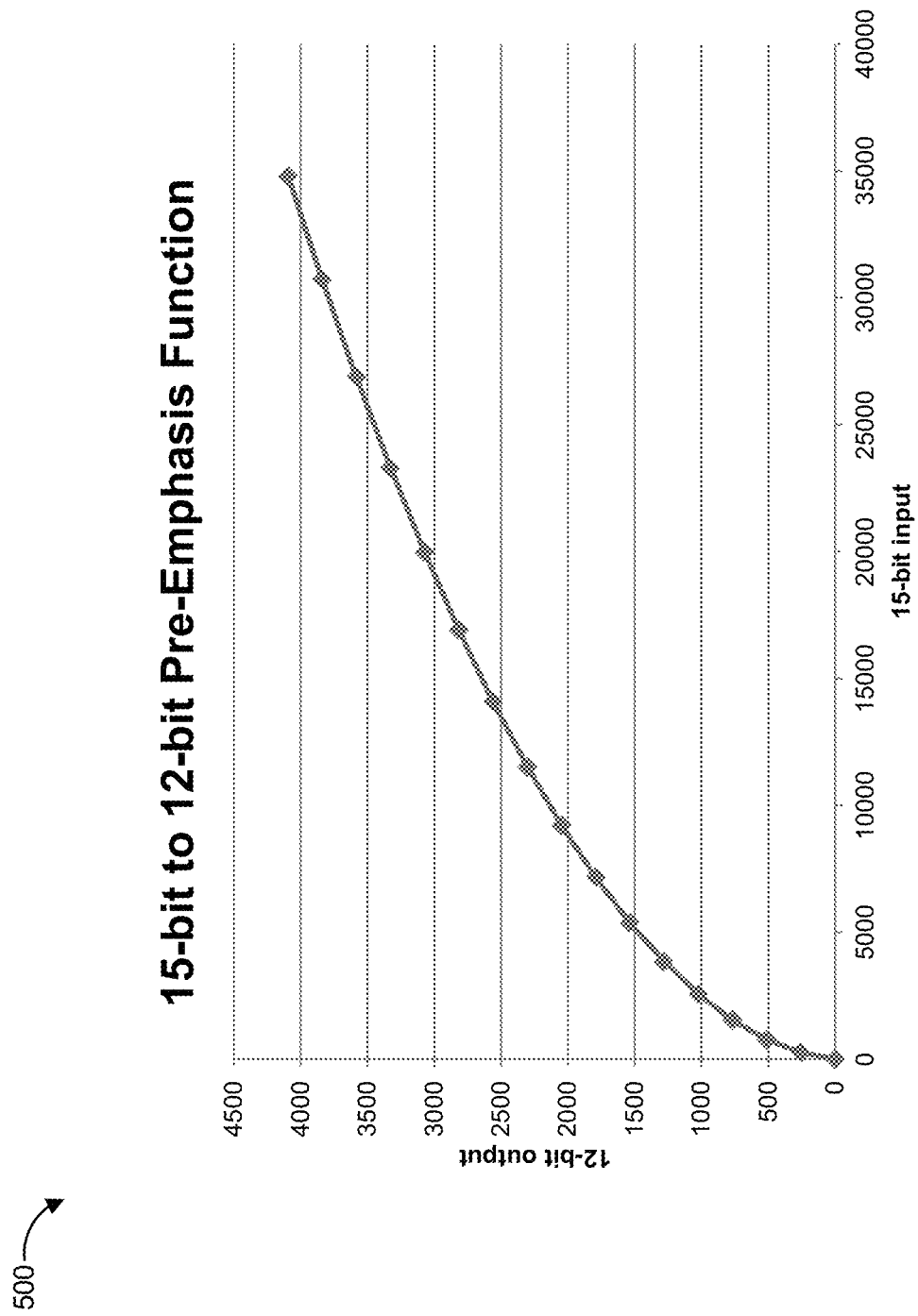
FIG. 5 is a plot illustrating an example pre-emphasis function.

FIG. 5 is a plot 500 that graphically illustrates one example piecewise linear function for transforming raw pixels from 15-bit data to 12-bit data. Table 1 below provides example points along the plot 500.

TABLE 1

| 15-bit input | 12-bit output |
| --- | --- |
| 0 | 0 |
| 256 | 256 |
| 768 | 512 |
| 1536 | 768 |
| 2560 | 1024 |
| 3840 | 1280 |
| 5376 | 1536 |
| 7168 | 1792 |
| 9216 | 2048 |
| 11520 | 2304 |
| 14080 | 2560 |
| 16896 | 2816 |
| 19968 | 3072 |
| 23296 | 3328 |
| 26880 | 3584 |
| 30720 | 3840 |
| 34800 | 4095 |

The pre-emphasis can be performed by the image processing system 53 given the understanding that not all video image data values in a bit range (such as a 15-bit range including 0-32767) carry the same information. Incoming light at each pixel can be governed by a Poisson process that results in a different photon shot noise (PSN) at each light level. The Poisson random distribution can have a unique characteristic where a variance of a distribution is equal to a mean of the distribution. Thereby, the standard deviation is equal to the square root of the mean. From this understanding, the uncertainty (such as indicated by the standard deviation) associated with each measured digital number output (DN), corresponding to incoming light for a particular pixel, can be proportional to $\sqrt{DN}$. To pre-emphasize, one or more digital values in an input domain can be lumped to a single digital value in an output domain. If Q adjacent DN values are lumped together (for instance, quantized) into one, the resulting noise can be proportional to $\sqrt{Q^3}$. The quantization noise can be minimized by choosing Q such that $\sqrt{DN} \alpha \sqrt{Q^3}$ (for example, $Q\alpha^3 \sqrt{DN}$). The complexity of this function can be reduced by constructing a piecewise linear function from the function. Using this technique, additional noise added by the pre-emphasis can be reduced, such as to a small percentage (like 1% of the photon shot noise in an example worst case scenario).

A conversion function may be used to convert pre-emphasized values after decoding. For example, the following function, which is expressed in pseudocode, can be used to convert 12-bit data back to 15-bit data after decoding.

int index=imageData[i][j]>>8;
int offset=imageData[i][j] & 0xff;
int value=(index+1)*offset+((index+1)*index*128)+((index+1)>>1);

In some instances, using a conversion function (sometimes referred to as a pre-emphasis function) that has a relatively simple inverse can helpful for decoding compressed image in hardware using parallel processing. For example, when an example conversion function has a relatively simple inverse, a Graphical Processing Unit (GPU) may be used to relatively quickly convert 12-bit data back to its original 15-bit data form after decompression.

Additional information regarding pre-emphasis techniques can be found in U.S. Pat. No. 8,174,560, the entire disclosure of which is herein incorporated by reference.

At block 406, the compression system 54 can compress the video image data pre-emphasized by the image processing system 53. For example, the compression system 54 can compress the pre-emphasized video image data as described with respect to FIG. 6 or using another compression algorithm. The compression system 54 can, in some implementations, perform one or more of the following: (i) compress the video image data without using a frame memory that stores a full image frame, (ii) compress the video image data using one memory device and without using any memory positioned off-chip relative to the one memory device, (iii) compress the video image data using a static memory that may not be periodically refreshed rather than a dynamic memory that must be periodically refreshed, and (iv) operate according to the timing of a clock and correctly compress the video image data despite the clock stopping for a period of time such as a 5, 10, 20, or 30 seconds or 1, 2, 3, 5, or 10 minutes. The compression system 54 moreover can be used to compress video image data that is presentable as 3D video images.

Figure 6:
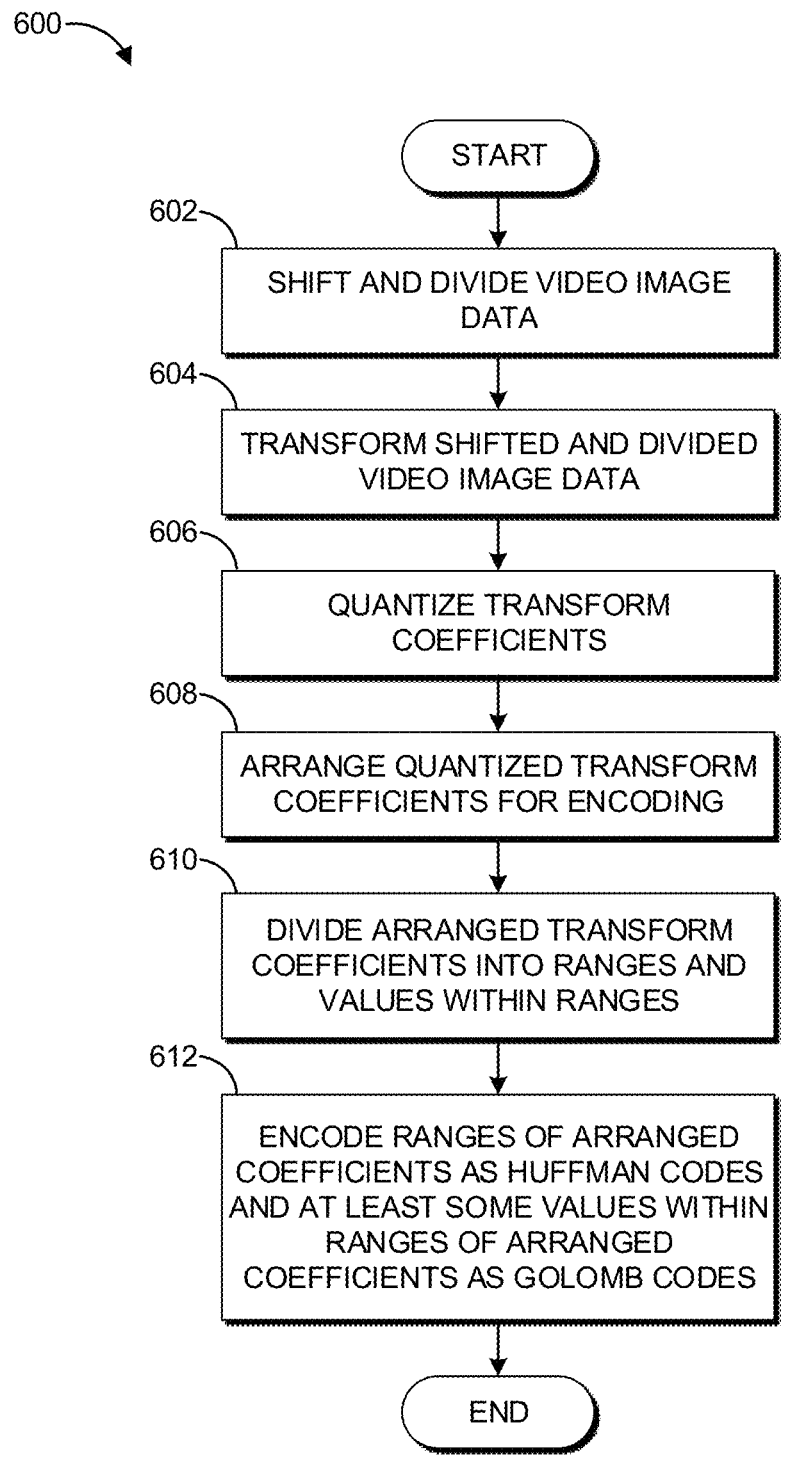
FIG. 6 illustrates an example process for compressing video image data that is performable by an image capture device, such as the image capture device of FIG. 3A.

FIG. 6 is a flowchart 600 illustrating an example process for compressing video image data that is performable by an image capture device, such as the phone 10, the camera module 30, the video camera 40, or the image capture device 50. The flowchart 600 can represent a control routine stored in a memory device, such as the memory device 55, the ROM 112, RAM 113, or memory 175. Additionally, a processor, such as the controller 110, can be configured to execute the control routine. For convenience, the flowchart 600 is described in the context of the image capture device 50 but may instead be implemented by other systems described herein or other appropriate computing systems not shown. The flowchart 600 advantageously, in certain embodiments, depicts an example approach by which a relatively small or low-power handheld device like a cellphone can compress video image data.

At block 602, the compression system 54 can shift and divide video image data. Values of the video image data can be shifted by an amount equal to a central value for the video image data that depends on a number of bits of the data (for instance, the central value can be $0.5 \cdot 2^n$ for n-bit data, which means 2048 in the case of 12-bit data). The shifting can shift the values around a value of 0 for further processing. The values can also be divided into slices and macroblocks. In one implementation, a maximum size of the slice is 256×32 pixels, and maximum size slices are packed from left to right. If some pixels are still left on the end of each line, a slice of size 256×32 pixels, 128×32 pixels, 64×32 pixels, 32×32 pixels, or another size can be made by packing pixels of value 0 at the end. In instances where the pixels follow a Bayer pattern, each slice can have 128×16 Green1, Green2, Red, and Blue pixels, and the pixels can be further divided into 8 macroblocks (16×16 pixels) of Green1, Green2, Red, and Blue pixels.

At block 604, the compression system 54 can transform the shifted and divided video image data, such as using a discrete cosine transform (DCT) or another transform. In one example, the compression system 54 can transform each macroblock of the shifted and divided video image data using a 16×16 DCT. The 16×16 DCT notably can provide, in some instances, higher compression efficiency than an 8×8 DCT. The two dimensional 16×16 DCT can moreover be separable into 32 one dimensional 1×16 DCT calculations. This separability advantageously can, in certain embodiments, facilitate the use of memory having a capacity less than a frame memory (for example, multiple lines of on-chip memory 62) when performing compression. The output from the transformation can be transform coefficients for the video image data.

At block 606, the compression system 54 can quantize the transform coefficients. The quantization can include two components. The first component can be a quantization table value from one or more quantization tables. For example, one quantization table can be used for Green1 and Green2 channels, and another quantization table can be used for blue and red channels. The one or more quantization tables can be defined in a frame header. The second component can be a quantization scale factor. The quantization scale factor can be the same for each value within a slice, vary from a minimum value (for example, 1) to a maximum value (for example, 255), be defined in a slice header, and used for achieving a target slice size. The quantization scale factor can be determined based at least on a target frame size or a technique such as is described in U.S. Pat. No. 9,800,875, which is herein incorporated by reference in its entirety. The quantization scale factor may be set constant in some instances to generate a compressed video of certain quality irrespective of the compressed image size. In one implementation, the quantized values for the transform coefficients can be determined using Equation 1 below.

$$\text{Quantized Value} = \frac{\text{Transformed Coefficient Value}}{\text{Quantization Table Value} * \text{Quantization Scale Factor}} \quad \text{Equation 1}$$

At block 608, the compression system 54 can arrange the quantized transform coefficients slice-by-slice for encoding and so that green, red, and blue components may be encoded separately within a slice. The DC coefficients of the macroblocks of one slice can be arranged left to right. The AC coefficients of the macroblocks of the one slice can arranged so that (i) all particular location AC coefficients in a 16×16 DCT table from different macroblocks in the slice are arranged one after the other and (ii) the different AC coefficients are arranged by the zig-zag scan order illustrated by Table 2 below where the index in Table 2 indicates a position in the sequence for the quantized transform coefficients.

TABLE 2

| 0 | 1 | 5 | 6 | 14 | 15 | 27 | 28 | 44 | 45 | 65 | 66 | 90 | 91 | 119 | 120 |
|---|---|---|---|----|----|----|----|----|----|----|----|----|----|-----|-----|
| 2 | 4 | 7 | 13 | 16 | 26 | 29 | 43 | 46 | 64 | 67 | 89 | 92 | 118 | 121 | 150 |
| 3 | 8 | 12 | 17 | 25 | 30 | 42 | 47 | 63 | 68 | 88 | 93 | 117 | 122 | 149 | 151 |
| 9 | 11 | 18 | 24 | 31 | 41 | 48 | 62 | 69 | 87 | 94 | 116 | 123 | 148 | 152 | 177 |
| 10 | 19 | 23 | 32 | 40 | 49 | 61 | 70 | 86 | 95 | 115 | 124 | 147 | 153 | 176 | 178 |
| 20 | 22 | 33 | 39 | 50 | 60 | 71 | 85 | 96 | 114 | 125 | 146 | 154 | 175 | 179 | 200 |
| 21 | 34 | 38 | 51 | 59 | 72 | 84 | 97 | 113 | 126 | 145 | 155 | 174 | 180 | 199 | 201 |
| 35 | 37 | 52 | 58 | 73 | 83 | 98 | 112 | 127 | 144 | 156 | 173 | 181 | 198 | 202 | 219 |
| 36 | 53 | 57 | 74 | 82 | 99 | 111 | 128 | 143 | 157 | 172 | 182 | 197 | 203 | 218 | 220 |
| 54 | 56 | 75 | 81 | 100 | 110 | 129 | 142 | 158 | 171 | 183 | 196 | 204 | 217 | 221 | 234 |
| 55 | 76 | 80 | 101 | 109 | 130 | 141 | 159 | 170 | 184 | 195 | 205 | 216 | 222 | 233 | 235 |
| 77 | 79 | 102 | 108 | 131 | 140 | 160 | 169 | 185 | 194 | 206 | 215 | 223 | 232 | 236 | 245 |
| 78 | 103 | 107 | 132 | 139 | 161 | 168 | 186 | 193 | 207 | 214 | 224 | 231 | 237 | 244 | 246 |
| 104 | 106 | 133 | 138 | 162 | 167 | 187 | 192 | 208 | 213 | 225 | 230 | 238 | 243 | 247 | 252 |
| 105 | 134 | 137 | 163 | 166 | 188 | 191 | 209 | 212 | 226 | 229 | 239 | 242 | 248 | 251 | 253 |
| 135 | 136 | 164 | 165 | 189 | 190 | 210 | 211 | 227 | 228 | 240 | 241 | 249 | 250 | 254 | 255 |

At block 610, the compression system 54 can divide the arranged transform coefficients into ranges and values within ranges. The ranges for the DC coefficients can be ranges of possible values of the DC coefficients, and the ranges for the AC coefficients can be ranges of possible values of the AC coefficients and counts of groupings of 0 values.

At block 612, the compression system 54 can encode the ranges of the arranged coefficients as Huffman codes and at least some of the values within the ranges of the arranged coefficients as Golomb codes. If a range has no more than one unique value, the one unique value may be encoded with a Huffman code and not a Golomb code. If a range has more than one unique value, values can be encoded by a combination of a Huffman code for the range and a Golomb code for the unique value within the range. The ranges and the Golomb codes for the ranges may be fixed or predefined, such as set at manufacture. The Huffman codes for the ranges, however, can vary from frame to frame with one or more Huffman tables being defined in a frame header. An encoder can use the adaptability of Huffman coding and may compute one or more Huffman tables at the end of each frame to be used for a next frame to optimize compression efficiency for particular video image data. In one implementation, a maximum number of bits in a Huffman code can be 12.

The value of a DC coefficient of a particular component in a slice may be encoded as a difference from the previous value of the DC coefficient. This difference can be termed a difference coefficient. An initial value for the DC coefficient for the particular component in the slice can be set to 0. To encode the values of individual DC coefficients, the compression system 54, for example, can (i) calculate the absolute value of the difference coefficient for the individual DC coefficient, (ii) append the Huffman code corresponding to the range of the individual DC coefficient to the bit stream, (iii) append the Golomb code corresponding to the value within the range of the individual DC coefficient to the bit stream, and (iv) append a sign bit (for example, 0 for positive and 1 for negative) to the bitstream if difference coefficient is nonzero.

Table 3 below provides an example DC encoding table. The Huffman code portion of the table can be used as a default table at the beginning of compression when compression statistics may be unknown.

TABLE 3

Example DC Huffman Table

| \|DC Value\| | Huffman Code | Huffman Bits | Golomb Code |
|---|---|---|---|
| 0-15 | 0 | 1 | Golomb-Rice(\|DC Value\|, 2) |
| 16-31 | 11 | 2 | Golomb-Rice(\|DC Value\| −16, 2) |
| 32-63 | 010 | 3 | Golomb-Rice(\|DC Value\| −32, 3) |
| 64-127 | 011 | 3 | Golomb-Rice(\|DC Value\| −64, 4) |
| 128-255 | 100 | 3 | Golomb-Rice(\|DC Value\| −128, 5) |
| 256-511 | 1010 | 4 | Golomb-Rice(\|DC Value\| −256, 6) |
| 512-inf | 1011 | 4 | ExpGolomb(\|DC Value\| −512, 7) |

For example, as can be seen from Table 3, if the difference coefficient may be 20, the Huffman code can be 11, the Huffman bits can be 2, the Golomb code can be Golomb-Rice(4, 2), and the sign bit can be 0. As another example, if the difference coefficient may be −75, the Huffman code can be 011, the Huffman bits can be 3, the Golomb code can be Golomb-Rice(11, 4), and the sign bit can be 1. As yet another example, if the difference coefficient may be 300, the Huffman code can be 1010, the Huffman bits can be 4, the Golomb code can be Golomb-Rice(44, 6), and the sign bit can be 0.

The values of AC coefficients can be represented by runs of zeros followed by a non-zero value. Different Huffman codes can denote the values of AC coefficients that are preceded by runs of zeros and those that are not preceded by runs of zeros. To encode the values of non-zero individual AC coefficients, the compression system 54, for example, can (i) calculate EACV=|AC value|−1 for the individual AC coefficient, (ii) determine whether the individual AC coefficient is preceded by one or more zeros, (iii) append the Huffman code corresponding to the EACV for the individual DC coefficient to the bit stream, (iv) append the Golomb code corresponding to the EACV to the bit stream if EACV exceeds 3, and (v) append a sign bit (for example, 0 for positive and 1 for negative) to the bitstream. Moreover, to encode the values of individual AC coefficients that have values of zero, the compression system 54, for example, can (i) calculate EACR=AC runs of zeros−1, (ii) append the Huffman code corresponding to the EACR to the bit stream, and (iii) append the Golomb code corresponding to the EACR to the bit stream if EACR exceeds 3.

Table 4 below provides an example AC encoding table. The Huffman code portion of the table can be used as a default table at the beginning of compression when compression statistics may be unknown.

TABLE 4

Example AC Huffman Table

| AC Value after zero AC Run | | | AC Value after non-zero AC Run | | | AC Run Length | | | |
|---|---|---|---|---|---|---|---|---|---|
| \|AC Value\| −1 | Huffman Code | Huffman Bits | \|AC Value\| −1 | Huffman Code | Huffman Bits | AC Run −1 | Huffman Code | Huffman Bits | Golomb Code |
| 0 | 01 | 2 | 0 | 10 | 2 | 0 | 1 | 1 | |
| 1 | 110 | 3 | 1 | 1111 | 4 | 1 | 001 | 3 | |
| 2 | 0010 | 4 | 2 | 000011 | 6 | 2 | 0100 | 4 | |
| 3 | 00000 | 5 | 3 | 0011000 | 7 | 3 | 0101 | 4 | |
| 4-7 | 0001 | 4 | 4-7 | 001101 | 6 | 4-7 | 011 | 3 | Golomb-Rice (\|AC Value\| −4, 0) |
| 8-15 | 1110 | 4 | 8-15 | 0011001 | 7 | 8-15 | 0001 | 4 | Golomb-Rice (\|AC Value\| −8, 1) |
| 16-31 | 00111 | 5 | 16-31 | 000010110 | 9 | 16-31 | 00001 | 5 | Golomb-Rice (\|AC Value\| −16, 2) |
| 32-63 | 0000100 | 7 | 32-63 | 0000101110 | 10 | 32-63 | 000000 | 6 | Golomb-Rice (\|AC Value\| −32, 3) |

TABLE 4-continued

Example AC Huffman Table

| AC Value after zero AC Run | | | AC Value after non-zero AC Run | | | AC Run Length | | | |
|---|---|---|---|---|---|---|---|---|---|
| \|AC Value\| −1 | Huffman Code | Huffman Bits | \|AC Value\| −1 | Huffman Code | Huffman Bits | AC Run −1 | Huffman Code | Huffman Bits | Golomb Code |
| 64-inf | 00001010 | 8 | 64-inf | 0000101111 | 10 | 64-inf | 000001 | 6 | ExpGolomb (\|AC Value\| −64, 4) |

To illustrate how Table 4 may be used for encoding, an example of encoding the eleven coefficient sequence of 0, 2, 0, 0, −10, 50, 0, 0, 0, 0, and 0 will be described. As can be seen from Table 4, for the run of one zero, the "AC Run−1" can be 0, the Huffman code can be 1, the Huffman bits can be 1, and there may be no Golomb code. Next, for the value of 2 which is preceded by the run of at least one zero, the "|AC Value|−1" can be 1, the Huffman code can be 1111, the Huffman bits can be 4, there may be no Golomb code, and the sign bit can be 0. Subsequently, for the run of two zeros, the "AC Run−1" can be 1, the Huffman code can be 001, the Huffman bits can be 3, and there may be no Golomb code. Then next, for the value of −10 which is preceded by the run of at least one zero, the "|AC Value|−1" can be 9, the Huffman code can be 0011001, the Huffman bits can be 7, the Golomb code can be Golomb-Rice(2, 1), and the sign bit can be 1. Then subsequently, for the value of 50 which is not preceded by a run of at least one zero, the "|AC Value|−1" can be 49, the Huffman code can be 0000100, the Huffman bits can be 7, the Golomb code can be Golomb-Rice(18, 3), and the sign bit can be 0. Finally, for the remaining run of five zeros, the "AC Run−1" can be 4, the Huffman code can be 011, the Huffman bits can be 3, and the Golomb code can be Golomb-Rice(1, 0).

As further part of the process of the flowchart 600, adaptive compression may be performed in certain implementations. For example, a size of a compressed frame can be set close to a target number of bytes, such as using the technique described in U.S. Pat. No. 9,800,875, which was previously herein incorporated by reference in its entirety. An entropy index for each slice can moreover be calculated, such as using a technique described in U.S. Pat. No. 9,800,875, which was previously herein incorporated by reference in its entirety. The entropy index along with an entropy multiplier can be used to calculate the quantization scale factor. The range of DCT 16×16 may notably be higher than that of DCT 8×8 for the same 12-bit input.

In some instances, because 32 lines of raw image data may be processed at a time, an image can be divided vertically (or otherwise) into 8 or more sections. After processing individual sections, a size of the compressed image thus far can be available. The size of the compressed image can then be used to update an entropy multiplier. At the end of frame compression, the size of the compressed image can be compared to a target size to further update the entropy multiplier.

Although some examples herein describe coding ranges or values within ranges using Huffman codes (or algorithms) and Golomb codes (or algorithms), other codes (or algorithms) can be used. For example, a lossless code, a lossy code, a variable length code, or a prefix code may be used.

In some embodiments, a first algorithm can be used for coding ranges and a second algorithm can be used for coding values within ranges. The first algorithm can, in some instances, be different from the second algorithm so that ranges and values within ranges may be coded differently. In other instances, the first algorithm can be the same as the second algorithm.

IV. Video Stream Specification

Video image data, which may be compressed using one or more approaches disclosed herein, can be organized according to a video stream specification. The video stream specification can, in some implementations, include one or more of the following features.

A frame structure in a compressed file can be divided into header and data portions. The header can be designed to be hardware friendly. In some instances, all values in the header other than the size of a compressed frame may be known before the compression begins. A header version may be used to decode the compressed file, such as for playback on-camera or off-camera, if revisions were made to the file format. The header can, for instance, contain 600 bytes. The header can be followed by slices ordered left to right and top to bottom. Each slice can contain an integer number of bytes. One example header structure is shown below in Table 5.

TABLE 5

Frame Header

| Begin Location | Bytes | Description |
|---|---|---|
| 0 | 8 | Number of bytes in compressed frame |
| 8 | 1 | Header: Major Version |
| 9 | 1 | Header: Minor Version |
| 10 | 2 | Horizontal Size |
| 12 | 2 | Veritical Size |
| 14 | 1 | Macroblocks per slice |
| 15 | 1 | Chroma Format 0 --> 422 1 --> 444 |
| 16 | 2 | Number of slices per Frame |
| 18 | 2 | Reserved - Set to 0 |
| 20 | 256 | Luma Quantization Table |
| 276 | 256 | Chroma Quantization Table |
| 532 | 14 | DC Huffman Table |
| 546 | 18 | AC Value zero run Huffman table |
| 564 | 18 | AC Value non-zero run Huffman table |
| 582 | 18 | AC run length Huffman table |

Individual entries in a Huffman table can be 2 bytes (16-bits) wide. As illustrated by Table 6 below, the most significant bits (for example, first 4 bits) of a Huffman table structure can represent a size of the Huffman code, and the least significant bits (for example, last 12 bits) of the Huffman table structure can represent the Huffman code itself that may be aligned to the right and left padded with zeros.

TABLE 6

| Code Size (4 bits) | Huffman Code (12 bits) |
|---|---|

Each slice can have a header (for example, 9 bytes) followed by Green1, Green2, Red, and Blue components. Each component can begin on a byte boundary. If a component may have fractional bytes, the component can be padded with zeros to form a complete byte. Table 7 below illustrates an example slice structure.

TABLE 7

| Slice Header (9 bytes) | Green1 Data (Variable) | Green2 Data (Variable) | Red Data (Variable) | Blue Data (Variable) |
| --- | --- | --- | --- | --- |

Table 8 below shows an example slice header structure. The number of bits of the slice header structure can be specified to avoid confusing padded bits with Huffman codes of value zero. If the number of bits in a component may not be a multiple of 8, a next component can begin on a byte boundary.

TABLE 8

| Slice Header | | |
| --- | --- | --- |
| Begin Location | Bytes | Description |
| 0 | 1 | Quantization Scale Factor |
| 1 | 2 | Number of bits in G1 Stream |
| 3 | 2 | Number of bits in G2 Stream |
| 5 | 2 | Number of bits in B Stream |
| 7 | 2 | Number of bits in R Stream |

V. 3D Image Display

The displays of or connected to the image capture devices described herein (for example, the display 11 of the device 10 of FIG. 1A) can, in some implementations, be or include 3D displays. A 3D display may be configured to produce light so that a 3D image (sometimes referred to as "multi-dimensional content") is observed by the user. Stereoscopic displays may, for instance, be used to form images that appear to a user to be 3D when viewed at the proper angle or using specifically designed eye wear. At least some embodiments are directed to a display that is configured to produce an image that appears to be in 3D space, such that a user may be able to view the 3D image from multiple directions without moving the display. The display may not need to be positioned within the user's field of view. In some embodiments, the 3D image may appear to be suspended or float above the display. Thus, a user may be able to "walk around" the 3D image to observe different views of the image as though the content in the image was a physical object.

Some embodiments of the 3D display may include a diffractive lightfield backlighting system. The diffractive lightfield backlighting system may include a multiview or 3D display and a light source configured for rear illumination of the 3D display. The multiview display may include a plurality of diffractive elements, each including a plurality of diffractive gratings, configured to direct light illuminated thereon into multiple directions. The direction that the light is directed may be based on the diffractive properties of the diffractive elements. In some embodiments, the multiple directions may correspond to a different view of the 3D image. Multiple light rays directed in the same or substantially similar direction may form an image corresponding to a particular view of the 3D content. Accordingly, multiple views of the 3D content may be displayed in multiple directions based on the plurality of diffractive elements. Some implementations of embodiments herein are described in more detail, for example, in U.S. Pat. No. 9,128,226 entitled "Multibeam Diffraction Grating-Based Backlighting" and U.S. Pat. No. 9,459,461 entitled "Directional Backlighting," the contents of which are each incorporated herein in their entirety. A 3D display may be separately operable from a 2 Dimensional (2D) display. The 3D display may, for instance, be disposed behind or in front of the 2D display. As such, the 3D display or 2D display can each be turned on and off without affecting the use of the other.

Other embodiments of the 3D display are possible for generating a 3D image. For example, the 3D display may be configured to display a 3D image based on a reconstruction of a holographic interference pattern associated with a hologram. The interference pattern may be reconstructed based on features stored in the fringe pattern, and the display may include pixels driven to duplicate the interference fringe pattern on a screen. The pixels may be illuminated by a light source, which may be transformed (e.g., varied in phase or transmittance) by the interference pattern of the pixels to generate a 3D holographic image. Some implementations may be found in, for example, U.S. Pat. No. 9,304,491, entitled "Transparent Holographic Display with Dynamic Image Control"; U.S. Pat. No. 6,760,135, entitled "Holographic Display," the contents of which are each incorporated herein in their entirety. In another embodiment, the display may include a plurality of holographic pixels that are illuminated modulated using an spatial light modulator, for example, as described in U.S. Pat. No. 7,190,496, entitled "Enhanced Environment Visualization Using Holographic Sterograms," the contents of which is incorporated herein in its entirety.

Advantageously, the 3D display may, in certain embodiments, not need to utilize lenticular lenses or eye tracking technology. Without subscribing to a particular scientific theory, embodiments herein can provide for higher resolution as compared to displays using lenticular lenses, the 3D display may be separately operable from a standard 2D display, and the 3D display provides for multi-directional content having multiple views.

Moreover, the image capture devices described herein can, in some implementations, capture 3D images for reproduction by a 3D display. For instance, the first cameras 12, the second cameras 17, images sensors of the camera module 30, or image sensors of the video camera can be used to capture 3D images. In one example, the first cameras 12, the second cameras 17, or the images sensors of the camera module 30 can be used to capture 3D images, and the phone 10 can in turn store the 3D images and playback the 3D images using the display 11. Such a design can facilitate live or simultaneous capture and display of 3D images.

The 3D content, holographic content, or other content displayed on the 3D display can be compressed according to any of the techniques described herein, such as for example according to the techniques for compressing raw image data described with respect to FIGS. 3A-6. For instance, the phone 10 may capture compressed raw image data using two or more of the first cameras 12, using the second cameras 17, or one or more of the image sensors of the camera module 30 (or using a different camera module attached to the phone 10). The phone 10 can then record the compressed image data in one or more files on a memory device of the phone 10, or in a memory device in a module attached to the phone 10. The phone 10 can then access the image data, decompress it, and prepare it for playback on the display 11 as 3D, holographic content, or the like, as appropriate. The phone 10 can additionally according to some embodiments play the 3D, holographic, or other content back in real-time without first compressing and storing the content, while the phone 10 is recording.

VI. Additional Embodiments and Terminology

FIG. 7 illustrates the image capture device 50 in communication with a phone 100. The image capture device 50 can, for example, be an embodiment of the camera module 30, and the phone 100 can, for example, be an embodiment of the phone 10. The phone 100 can be modular and couple to one or more modules as described herein. For example, the phone can mechanically or electrically connect to a power source 60, a memory device 62, or an input/output (I/O) device 64, as well as the image capture device 50 or one or more other modules 66. In addition, the phone 100 can electrically communicate with one or more other modules 61, 63, 65, 67 respectively through the power source 60, the memory device 62, the input/output (I/O) device 64, and the image capture device 50, and the one or more other modules 61, 63, 65, 67 can respectively couple to the power source 60, the memory device 62, the input/output (I/O) device 64, and the image capture device 50. Embodiments and features of modular phones and camera modules are further described in U.S. Patent Application Publication No. 2017/0171371; the entire disclosure of which is incorporated herein by reference.

Figure 8:
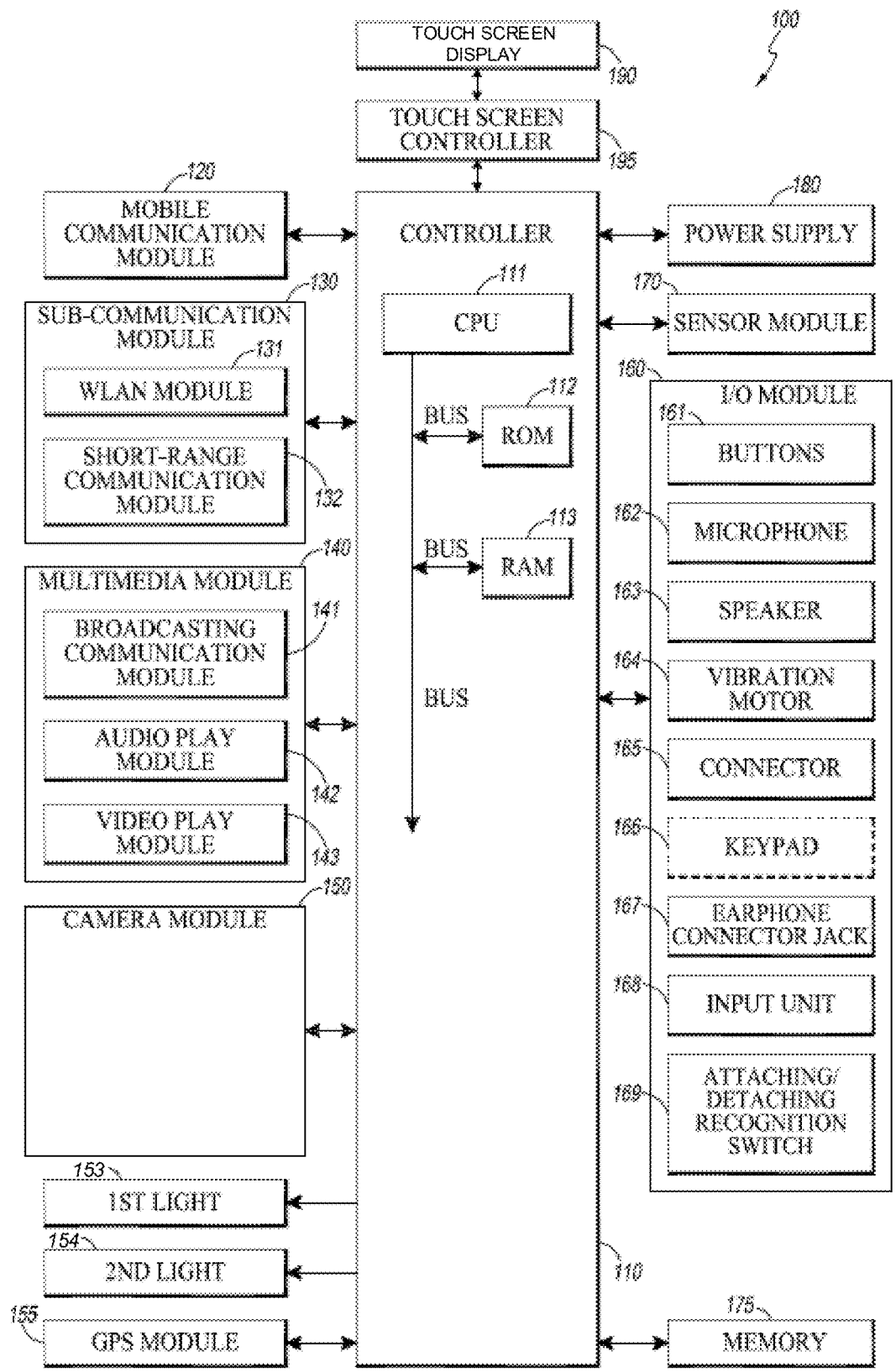
FIG. 8 illustrates example components of the phone of FIG. 1A or the camera module of FIG. 1C.

FIG. 8 illustrates components of the phone 100. The phone 100 may be connected to an external device by using an external connection device, such as a sub-communication module 130, a connector 165, and an earphone connecting jack 167. The "external device" may include a variety of devices, such as earphones, external speakers, Universal Serial Bus (USB) memories, chargers, cradles/docks, Digital Multimedia Broadcasting (DMB) antennas, electronic payment related devices, health care devices (for example, blood sugar testers), game consoles, vehicle navigations, a cellphone, a smart phone, a tablet PC, a desktop PC, a server, and the like, which are removable from the electronic device and connected thereto via a cable.

The phone 100 includes a touch screen display 190 and a touch screen controller 195. The phone 100 also includes a controller 110, a mobile communication module 120, the sub-communication module 130, a multimedia module 140, a camera module 150, a Global Positioning System (GPS) module 155, an input/output module 160, a sensor module 170, a memory 175, and a power supply 180. The sub-communication module 130 includes at least one of Wireless Local Area Network (WLAN) 131 and a short-range communication module 132, and the multimedia module 140 includes at least one of a broadcast communication module 141, an audio play module 142, and a video play module 143. The input/output module 160 includes at least one of buttons 161, a microphone 162, a speaker 163, a vibration motor 164, the connector 165, and a keypad 166. Additionally, the electronic device 100 can include one or more lights including a first light 153 that faces one direction and a second light 154 that faces another direction.

The controller 110 may include a Central Processing Unit (CPU) 111, a Read Only Memory (ROM) 112 for storing a control program, such as an Operating System (OS), to control the phone 100, and a Random Access Memory (RAM) 113 for storing signals or data input from an external source or for being used as a memory space for working results in the phone 100. The CPU 111 may include a single core, dual cores, triple cores, or quad cores. The CPU 111, ROM 112, and RAM 113 may be connected to each other via an internal bus.

The controller 110 may control the mobile communication module 120, the sub-communication module 130, the multimedia module 140, the camera module 150, the GPS module 155, the input/output module 160, the sensor module 170, the memory 175, the power supply 180, the touch screen display 190, and the touch screen controller 195.

The mobile communication module 120 connects the electronic device 100 to an external device through mobile communication using at least a one-to-one antenna or a one-to-many antenna under the control of the controller 110. The mobile communication module 120 transmits/receives wireless signals for voice calls, video conference calls, Short Message Service (SMS) messages, or Multimedia Message Service (MMS) messages to/from a cell phone, a smart phone, a tablet PC, or another device, with the phones having phone numbers entered into the phone 100.

The sub-communication module 130 may include at least one of the WLAN module 131 and the short-range communication module 132. For example, the sub-communication module 130 may include either the WLAN module 131 or the-short range communication module 132, or both.

The WLAN module 131 may be connected to the Internet in a place where there is a wireless Access Point (AP), under the control of the controller 110. The WLAN module 131 supports the WLAN Institute of Electrical and Electronic Engineers (IEEE)802.11x standard. The short-range communication module 132 may conduct short-range communication between the phone 100 and an image rendering device under the control of the controller 110. The short-range communication may include communications compatible with BLUETOOTH™, a short range wireless communications technology at the 2.4 GHz band, commercially available from the BLUETOOTH SPECIAL INTEREST GROUP, INC., Infrared Data Association (IrDA), WI-FI™ DIRECT, a wireless technology for data exchange over a computer network, commercially available from the WI-FI ALLIANCE, NFC, and the like.

The phone 100 may include at least one of the mobile communication module 120, the WLAN module 131, and the short-range communication module 132 based on the performance requirements of the phone 100. For example, the phone 100 may include a combination of the mobile communication module 120, the WLAN module 131, and the short-range communication module 132 based on the performance requirements of the phone 100.

The multimedia module 140 may include the broadcast communication module 141, the audio play module 142, or the video play module 143. The broadcast communication module 141 may receive broadcast signals (for example, television broadcast signals, radio broadcast signals, or data broadcast signals) and additional broadcast information (for example, an Electric Program Guide (EPG) or an Electric Service Guide (ESG)) transmitted from a broadcasting station through a broadcast communication antenna under the control of the controller 110. The audio play module 142 may play digital audio files (for example, files having extensions, such as mp3, wma, ogg, or wav) stored or received under the control of the controller 110. The video play module 143 may play digital video files (for example, files having extensions, such as mpeg, mpg, mp4, avi, move, or mkv) stored or received under the control of the controller 110. The video play module 143 may also play digital audio files.

The multimedia module 140 may include the audio play module 142 and the video play module 143 except for the broadcast communication module 141. The audio play module 142 or video play module 143 of the multimedia module 140 may be included in the controller 110.

The camera module 150 may include one or more cameras for capturing still images or video images under the control of the controller 110. Furthermore, the one or more cameras may include an auxiliary light source (for example, a flash) for providing an amount of light for capturing an image. In one example, one or more cameras may be placed on the front of the phone 100, and one or more other cameras may be placed on the back of phone 100. Two or more cameras may be arranged, in some implementations, adjacent to each other (for example, the distance between the two or more cameras, respectively, may be in the range of 1 cm. to 8 cm.), capturing 3 Dimensional (3D) still images or 3D video images.

The GPS module 155 receives radio signals from a plurality of GPS satellites in orbit around the Earth and may calculate the position of the phone 100 by using time of arrival from the GPS satellites to the phone 100.

The input/output module 160 may include at least one of the plurality of buttons 161, the microphone 162, the speaker 163, the vibrating motor 164, the connector 165, and the keypad 166.

The at least one of the buttons 161 may be arranged on the front, side or back of the housing of the phone 100, and may include at least one of a power/lock button, a volume button, a menu button, a home button, a back button, and a search button.

The microphone 162 generates electric signals by receiving voice or sound under the control of the controller 110.

The speaker 163 may output sounds externally corresponding to various signals (for example, radio signals, broadcast signals, digital audio files, digital video files or photography signals) from the mobile communication module 120, sub-communication module 130, multimedia module 140, or camera module 150 under the control of the controller 110. The speaker 163 may output sounds (for example, button-press sounds or ringback tones) that correspond to functions performed by the electronic device 100. There may be one or multiple speakers 163 arranged in at least one position on or in the housing of the phone 100.

The vibrating motor 164 may convert an electric signal to a mechanical vibration under the control of the controller 110. For example, the phone 100 in a vibrating mode operates the vibrating motor 164 when receiving a voice call from another device. There may be at least one vibration motor 164 inside the housing of the phone 100. The vibration motor 164 may operate in response to a touch activity or continuous touches of a user over the touch screen display 190.

The connector 165 may be used as an interface for connecting the phone 100 to the external device or a power source. Under the control of the controller 110, the phone 100 may transmit data stored in the memory 175 of the electronic device 100 to the external device via a cable connected to the connector 165, or receive data from the external device. Furthermore, the phone 100 may be powered by the power source via a cable connected to the connector 165 or may charge the battery using the power source.

The keypad 166 may receive key inputs from the user to control the phone 100. The keypad 166 includes a mechanical keypad formed in the phone 100, or a virtual keypad displayed on the touch screen display 190. The mechanical keypad formed in the phone 100 may optionally be omitted from the implementation of the phone 100, depending on the performance requirements or structure of the phone 100.

An earphone may be inserted into the earphone connecting jack 167 and thus, may be connected to the phone 100.

A stylus pen 168 may be inserted and removably retained in the phone 100 and may be drawn out and detached from the phone 100.

A pen-removable recognition switch 169 that operates in response to attachment and detachment of the stylus pen 168 is equipped in an area inside the phone 100 where the stylus pen 168 is removably retained, and sends a signal that corresponds to the attachment or the detachment of the stylus pen 168 to the controller 110. The pen-removable recognition switch 169 may have a direct or indirect contact with the stylus pen 168 when the stylus pen 168 is inserted into the area. The pen-removable recognition switch 169 generates the signal that corresponds to the attachment or detachment of the stylus pen 168 based on the direct or indirect contact and provides the signal to the controller 110.

The sensor module 170 includes at least one sensor for detecting a status of the phone 100. For example, the sensor module 170 may include a proximity sensor for detecting proximity of a user to the phone 100, an illumination sensor for detecting an amount of ambient light of the electronic device 100, a motion sensor for detecting the motion of the phone 100 (for example, rotation of the phone 100, acceleration or vibration applied to the phone 100), a geomagnetic sensor for detecting a point of the compass using the geomagnetic field, a gravity sensor for detecting a direction of gravity, and an altimeter for detecting an altitude by measuring atmospheric pressure. At least one sensor may detect the status and generate a corresponding signal to transmit to the controller 110. The sensor of the sensor module 170 may be added or removed depending on the performance requirements of the phone 100.

The memory 175 may store signals or data input/output according to operations of the mobile communication module 120, the sub-communication module 130, the multimedia module 140, the camera module 150, the GPS module, the input/output module 160, the sensor module 170, the touch screen display 190 under the control of the controller 110. The memory 175 may store the control programs and applications for controlling the phone 100 or the controller 110.

The term "storage" can refer to the memory 175, and also to the ROM 112, RAM 113 in the controller 110, or a memory card (for example, a Secure Digital (SD) card, a memory stick, and the like) installed in the phone 100. The storage may also include a non-volatile memory, a volatile memory, a Hard Disc Drive (HDD), a Solid State Drive (SSD), and the like.

The power supply 180 may supply power from at least one battery placed inside the housing of the phone 100 under the control of the controller 110. The at least one battery can thus power the phone 100. The power supply 180 may supply the phone 100 with the power input from the external power source via a cable connected to the connector 165. The power supply 180 may also supply the phone 100 with wireless power from an external power source using a wireless charging technology.

The touch screen controller 195 receives information (for example, information to be generated for making calls, data transmission, broadcast, or photography) that is processed by the controller 110, converts the information to data to be displayed on the touch screen display 190, and provides the data to the touch screen display 190. The touch screen display 190 displays the data received from the touch screen controller 195. For example, in a call mode, the touch screen display 190 may display a User Interface (UI) or a Graphic User Interface (GUI) with respect to a call. The touch screen display 190 may include at least one of liquid crystal displays, thin film transistor-liquid crystal displays, organic light-emitting diodes, flexible displays, 3D displays (for instance, for presenting 3D images as described herein), multiview displays, electrophoretic displays, or combinations of the same and the like. The touch screen display 190 moreover can be used to present video images as described herein, such as including 2D video images, 3D video images, and 2D/3D virtual reality (VR), augmented reality (AR), and mixed reality (MR). In some implementations, the phone 100 further includes a holographic module that processes and outputs holographic video images for presentation, such as on the touch screen display 190 or another display of the phone 100.

The touch screen display 190 may be used as an output device and also as an input device, and for the latter case, may have a touchscreen panel to operate as a touch screen. The touch screen display 190 may send to the touch screen controller 195 an analog signal that corresponds to at least one touch to the UI or GUI. The touch screen display 190 may detect the at least one touch by a user's physical contact (for example, by fingers including a thumb) or by a touchable input device (for example, the stylus pen). The touch screen display 190 may also receive a dragging movement of a touch among at least one touch and transmit an analog signal that corresponds to the dragging movement to the touch screen controller 195. The touch screen display 190 may be implemented to detect at least one touch in, for example, a resistive method, a capacitive method, an infrared method, an acoustic wave method, and the like.

The term "touches" is not limited to physical touches by a physical contact of the user or contacts with the touchable input device, but may also include touchless proximity (for example, maintaining a detectable distance less than 1 mm. between the touch screen display 190 and the user's body or touchable input device). The detectable distance from the touch screen display 190 may vary depending on the performance requirements of the phone 100 or structure of the phone 100, and more particularly, the touch screen display 190 may output different values (for example, current values) for touch detection and hovering detection to distinguishably detect that a touch event occurred by a contact with the user's body or the touchable input device and a contactless input (for example, a hovering event). Furthermore, the touch screen display 190 may output different values (for example, current values) for hovering detection over distance from where the hovering event occurs.

The touch screen controller 195 converts the analog signal received from the touch screen display 190 to a digital signal (for example, in XY coordinates on the touch panel or display screen) and transmits the digital signal to the controller 110. The controller 110 may control the touch screen display 190 by using the digital signal received from the touch screen controller 195. For example, in response to the touch event or the hovering event, the controller 110 may enable a shortcut icon displayed on the touch screen display 190 to be selected or to be executed. The touch screen controller 195 may also be incorporated in the controller 110.

Further, the touch screen controller 195 may determine the distance between where the hovering event occurs and the touch screen display 190 by detecting a value (for example, a current value) output through the touch screen display 190, convert the determined distance to a digital signal (for example, with a Z coordinate), and provide the digital signal to the controller 110.

One of more of the components or modules of the phone 100 can be removably coupled to a housing of the phone 100. To help illustrate this coupling, the housing of the phone 100 may be understood to be the phone 10, while the one of more of the components or modules can be removably coupled to the phone 10 via the module connector 20 to add or remove functionality for the phone 10. As one example, a portion or all of the camera module 30 can be removably coupled to the phone 10 to provide the phone 10 with the functionality of part or all the camera module 30.

While certain electronic devices shown and described herein are cellphones, other handheld electronic device embodiments are not cellphones, and do not include telephonic capability. For instance, some embodiments have the same or similar exterior as the electronic devices described herein, but do not include telephonic capability, such as in the case of a tablet computing device or digital camera. Such embodiments may nonetheless include any combination of the non-telephone components and functionality described herein, such as one or more of the following or portions thereof: controller 110, touch screen display 190 and touch screen controller 195, camera module 150, multimedia module 140, sub-communication module 130, first light 153, second light 154, GPS module 155, I/O module 160, and memory 176.

Figure 9A:
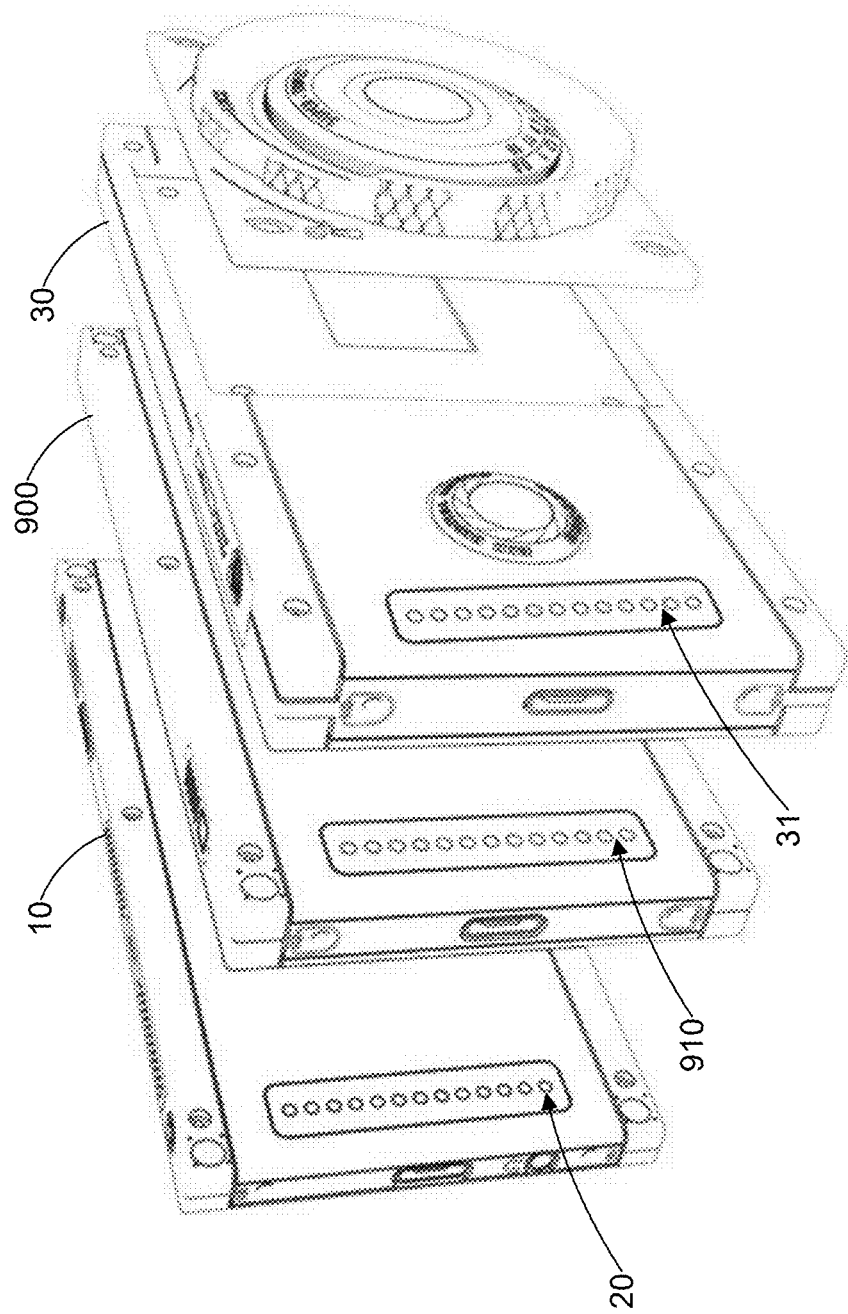
FIG. 9A illustrates a perspective view of the phone of FIG. 1A positioned for attachment to an expander module and the camera module of FIG. 1C.
Figure 9B:
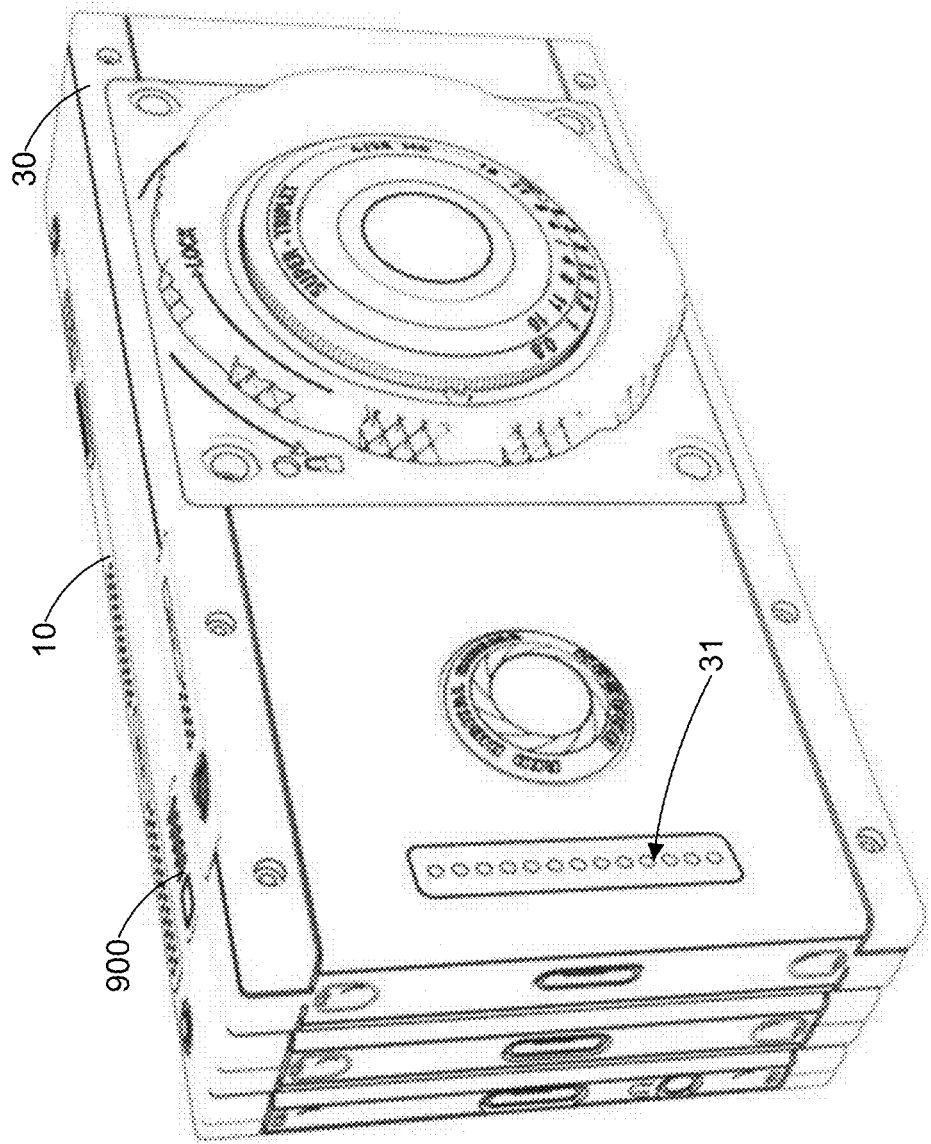
FIG. 9B illustrates a perspective view of the phone of FIG. 1A, the expander module of FIG. 9A, and the camera module of FIG. 1C when attached.

FIG. 9A illustrates a perspective view of the phone 10 positioned for attachment to an expander module 900 and the camera module 30, and FIG. 9B illustrates a perspective view of the phone 10, the expander module 900, and the camera module 30 when attached. The expander module 900 can include a memory device, a battery, or other component for enhancing the capacity of the phone 10. The expander module 900 can include a housing that supports magnets, which can be similar in structure and function to those of the camera module 30 in FIGS. 1C and 1D. The magnets can facilitate coupling of the housing to the phone 10 on one side and the camera module 30 on the other side. Additionally or alternatively, coupling can be achieved at least via a friction fit, interlocking structures, fasteners, mechanical snap surface structures, mechanical latch surface structures, mechanical interference fit surface structures, or the like.

The expander module 900 can also include module connectors (for example, two module connectors with one expander module connector 910 for coupling to a corresponding connector (now shown) on the camera module 30 and another expander module connector (not shown) for coupling to the module connector 20), similar to or the same as the module connector 20, that can interchangeably couple with a module and receive power or data from or transmit power or data to the module or one or more other devices coupled to the module.

Although Green1 and Green2 may be described as processed separately or differently in some instances herein, Green1 and Green2 may or may not be processed separately or differently. For example, Green1 and Green2 pixels can be separated into separate DCT macroblocks or may not be separated into separate DCT macroblocks. As another example, Green1 and Green2 pixels can be separated into separate scans or may not be separated into separate scans. In yet another example, a slice structure can have separate portions for Green1 and Green2 or may not have separate portions for Green1 and Green2. In a further example, Green1 and Green2 can have separate sizes in a slice header structure or may not have separate sizes in the slice header structure.

The various image capture devices (or certain components of the devices) may be described herein as being "configured to" perform one or more functions. As used herein this means that the device is capable of being placed in at least one mode (for example, user selectable modes) in which the device performs the specified functions. For example, the device may not necessarily perform the specified functions in all of the operational modes. Along these lines, use of the phrase "configured to" does not imply that the device has to actually be currently placed in the operational mode to be "configured to" perform the function, but only that the device is capable of being (for example, programmed to be) selectively placed into that mode.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, or, any processor, controller, microcontroller, or state machine. A processor also may be implemented as a combination of electronic devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, for example, one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "for example," "for example," "such as" and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

The above detailed description of embodiments is not intended to be exhaustive or to be limiting to the precise form disclosed above. While specific embodiments and examples are described above for illustrative purposes, various equivalent modifications are possible within the scope of the inventions described herein, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not only the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An electronic device, comprising:
   a housing;
   an image sensor comprising a color filter array and configured to generate motion video image data from light incident on the image sensor;
   a memory device; and
   one or more processors configured to:
      apply a lossy transform to the motion video image data, thereby transforming the motion video image data from a first bit-width to a second bit-width lower than the first bit-width;
      subsequent to application of the lossy transform, transform the motion video image data to obtain transform coefficients;
      quantize the transform coefficients to obtain quantized transform coefficients including a first quantized transform coefficient and a second quantized transform coefficient different from the first quantized transform coefficient;
      encode some of the quantized transform coefficients using a first algorithm to obtain first encoded coefficients;
      encode some of the quantized transform coefficients using a second algorithm to obtain second encoded coefficients; and
      store the first and second encoded coefficients to the memory device in a compressed file.

2. The electronic device of claim 1, wherein the one or more processors are configured to quantize the transform coefficients by at least using at least a first quantization table and a second quantization table different from the first quantization table.

3. The electronic device of claim 1, wherein the one or more processors are configured to apply noise filtering to the image data.

4. The electronic device of claim 1, wherein the compressed file comprises YUV data.

5. The electronic device of claim 1, wherein the compressed file comprises raw data.

6. The electronic device of claim 1, wherein the lossy transform comprises a piecewise linear function.

7. The electronic device of claim 1, wherein the first algorithm comprises a Huffman algorithm and the second algorithm comprises a Golomb algorithm.

8. The electronic device of claim 1, wherein the one or more processors is configured to vary the first algorithm during processing of the image data.

9. The electronic device of claim 8, wherein the one or more processors is configured to vary the first algorithm from processing a first frame of the image data to processing a second frame of the image data.

10. The electronic device of claim 8, wherein the second algorithm remains constant during processing of the image data by the one or more processors.

11. The electronic device of claim 1, wherein the one or more processors is configured to transform the image data using a discrete cosine transform.

12. The electronic device of claim 1, wherein the electronic device is a mobile phone.

13. The electronic device of claim 1, further comprising a display configured to present holographic images generated by the one or more processors from the image data.

14. A method of compressing and storing motion video image data, comprising:
   with an image sensor, generating motion video image data from light incident on the image sensor;
   applying a lossy transform to the motion video image data, thereby transforming the motion video image data from a first bit-width to a second bit-width lower than the first bit-width;
   subsequent to application of the lossy transform, transforming the motion video image data to obtain transform coefficients;
   quantizing the transform coefficients to obtain quantized transform coefficients including a first quantized transform coefficient and a second quantized transform coefficient different from the first quantized transform coefficient;
   encoding some of the quantized transform coefficients using a first algorithm to obtain first encoded coefficients;
   encoding some of the quantized transform coefficients using a second algorithm to obtain second encoded coefficients; and
   storing the first and second encoded coefficients to a memory device in a compressed file.

15. The method of claim 14, further comprising applying noise filtering to the image data.

16. The method of claim 14, wherein the compressed file comprises YUV data.

17. The electronic device of claim 1, wherein the compressed file comprises raw data.

18. The method of claim 14, wherein the quantizing the transform coefficients comprises using at least a first quantization table and a second quantization table different from the first quantization table.

19. The method of claim 14, wherein the lossy transform comprises a piecewise linear function.

20. The method of claim 14, wherein the first algorithm comprises a Huffman algorithm and the second algorithm comprises a Golomb algorithm.

* * * * *